United States Patent
Yi et al.

(10) Patent No.: US 8,121,602 B2
(45) Date of Patent: Feb. 21, 2012

(54) METHOD OF RESELECTING A CELL BASED ON PRIORITIES

(75) Inventors: Seung June Yi, Anyang-si (KR); Young Dae Lee, Anyang-si (KR); Sung Duck Chun, Anyang-si (KR); Sung Jun Park, Anyang-si (KR); Seon Don Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 161 days.

(21) Appl. No.: 12/681,507

(22) PCT Filed: Oct. 30, 2008

(86) PCT No.: PCT/KR2008/006409
§ 371 (c)(1),
(2), (4) Date: Apr. 2, 2010

(87) PCT Pub. No.: WO2009/057960
PCT Pub. Date: May 7, 2009

(65) Prior Publication Data
US 2010/0216469 A1   Aug. 26, 2010

Related U.S. Application Data

(60) Provisional application No. 60/983,866, filed on Oct. 30, 2007, provisional application No. 61/018,898, filed on Jan. 4, 2008, provisional application No. 61/019,575, filed on Jan. 7, 2008.

(30) Foreign Application Priority Data

Oct. 29, 2008   (KR) .................... 10-2008-0106297

(51) Int. Cl.
*H04W 36/00* (2009.01)

(52) U.S. Cl. ........ 455/436; 455/464; 455/453; 455/448; 455/513; 455/512; 455/435.3; 455/443

(58) Field of Classification Search ................. 455/513, 455/512, 435.3, 436, 443, 448, 453, 464
See application file for complete search history.

(56) References Cited

U.S. PATENT DOCUMENTS

| | | | |
|---|---|---|---|
| 6,421,334 | B1 | 7/2002 | Baines |
| 6,434,389 | B1 | 8/2002 | Meskanen et al. |
| 6,870,824 | B1 | 3/2005 | Kim et al. |
| 7,209,747 | B2 | 4/2007 | Chen |
| 2002/0126629 | A1 | 9/2002 | Jiang et al. |
| 2003/0224790 | A1 | 12/2003 | Choi |
| 2004/0162074 | A1 | 8/2004 | Chen |
| 2004/0208142 | A1 | 10/2004 | Saw |
| 2005/0220042 | A1 | 10/2005 | Chang et al. |

(Continued)

FOREIGN PATENT DOCUMENTS

| | | |
|---|---|---|
| KR | 10-2004-0008228 | 1/2004 |
| KR | 10-2005-0014984 | 2/2005 |
| KR | 10-2005-0028254 | 3/2005 |
| KR | 10-2006-0024756 | 3/2006 |
| KR | 10-0556589 | 3/2006 |
| KR | 10-2007-0080188 | 8/2007 |
| KR | 10-2007-0120453 | 12/2007 |
| WO | WO 2006/096036 A1 | 9/2006 |
| WO | WO 2006/118426 | 11/2006 |

*Primary Examiner* — Kwasi Karikari
(74) *Attorney, Agent, or Firm* — McKenna Long & Aldridge LLP

(57) ABSTRACT

A cell reselection method in a wireless communication system is described. A method of performing cell reselection based on priorities by a user equipment (UE) in a wireless communication system includes selecting one or more candidate cells satisfying a first criterion associated with priorities among a serving cell and neighbor cells, and camping on a cell satisfying a second criterion for cell reselection among the one or more candidate cells.

26 Claims, 18 Drawing Sheets

U.S. PATENT DOCUMENTS

| | | |
|---|---|---|
| 2006/0035662 A1 | 2/2006 | Jeong et al. |
| 2006/0104225 A1 | 5/2006 | Kim et al. |
| 2006/0116136 A1 | 6/2006 | Noma |
| 2006/0251023 A1 | 11/2006 | Choi |
| 2007/0049325 A1 | 3/2007 | Lee |
| 2007/0115894 A1 | 5/2007 | Herrmann et al. |
| 2007/0183372 A1 | 8/2007 | Janko et al. |
| 2007/0202892 A1 | 8/2007 | Voyer |
| 2007/0250751 A1 | 10/2007 | Cai et al. |
| 2007/0253393 A1 | 11/2007 | Tseng |
| 2008/0188247 A1 | 8/2008 | Worrall |
| 2008/0268843 A1* | 10/2008 | Ore et al. .................. 455/435.3 |
| 2009/0086853 A1 | 4/2009 | Ye |
| 2009/0088160 A1* | 4/2009 | Pani et al. .................... 455/436 |

* cited by examiner

|  | A | B1 | B2 |
|---|---|---|---|
| Scheme 1 | Trigger depending on minimum priority(MIN_P) | Suitable cell found | No suitable cell found |
| Scheme 2 | Trigger | Suitable cell satisfying MIN_P found | No suitable cell satisfying MIN_P found |
| Scheme 3 | Trigger depending on MIN_P | Suitable cell satisfying MIN_P found | No suitable cell satisfying MIN_P found |

METHOD OF RESELECTING A CELL BASED ON PRIORITIES

This application is a national phase application based on International Application No. PCT/KR2008/006409, filed on Oct. 30, 2008, which claims priority to U.S. Provisional Application No. 60/983,866, filed on Oct. 30, 2007, U.S. Provisional Application No. 61/018,898, filed on Jan. 4, 2008, U.S. Provisional Application No. 61/019,575, filed on Jan. 7, 2008 and Korean Patent Application No. 10-2008-0106297, filed on Oct. 29, 2008, all of which are incorporated by reference for all purposes as if fully set forth herein.

TECHNICAL FIELD

The present invention relates to a wireless communication system, and more particularly, to a method of reselecting a cell in a wireless communication system.

BACKGROUND ART

A basic purpose of selecting a cell is to receive a service from a base station. If signal strength or quality between a user equipment (UE) and a Node B is lowered due to movement of the UE, the UE reselects another cell in order to maintain data transmission quality. Hereinafter, physical signal characteristics related to the strength of a signal or the ratio of noise/interference of a signal will be referred to as signal characteristics.

A cell reselection method may be divided according to a radio access technology (RAT) of a cell participating in reselecting a cell and to a frequency characteristic as follows:
  intra-frequency cell reselection in which a UE reselects a cell which uses the same RAT and the same center frequency as a serving cell;
  inter-frequency cell reselection in which a UE reselects a cell which uses the same RAT as a serving cell and a different center frequency from the serving cell; and
  inter-RAT cell reselection in which a UE reselects a cell which uses a different RAT from a serving cell.

Referring to FIG. 1, if a UE is powered on, the UE starts operation in an idle mode. The UE automatically or manually selects a public land mobile network (PLMN) which is to be served and a RAT for communication (step S110). Information about the PLMN and RAT may be selected by the user of the UE or may be stored in a universal subscribed identity module (USIM).

The UE performs an initial cell selection process for selecting a cell having the greatest signal strength or quality value among cells having signal strength or quality values greater than a reference value (step S120). The reference value refers to a value defined in a system in order to guarantee quality of a physical signal during data transmission and reception. Accordingly, the reference value may vary with an applied RAT. The UE receives system information (SI) which is periodically transmitted by the Node B. The system information includes basic and indispensable information necessary when the UE accesses a network. The system information may include a neighbor cell list (NCL) related to cells adjacent to a serving cell. Therefore, the UE should receive all the system information before accessing the Node B and always have the latest system information. If power is on, the UE selects a cell in order to receive the system information in an idle mode.

The UE registers information (e.g., international mobile station identifier (IMSI)) thereof in a network to receive a service (e.g., paging) from the network (step S150). The UE does not always register the information thereof in the network whenever selecting a cell and registers the information when network information (e.g., tracking area identity (TAI)) received from the system information is different from network information known thereto (step S140).

If a signal strength or quality value measured from the Node B of the serving cell is lower than a value measured from a Node B of a neighbor cell, the UE selects another cell providing better signal characteristics than the cell of the Node B. If a priority is defined between frequencies or RATS, the UE selects a cell in consideration of the priority (step S160). This process is called a cell reselection process to discriminate from the initial cell selection of step S120. In a long term evolution (LTE) system, reference symbol received power (RSRP), reference symbol received quality (RSRQ), and received signal strength indicator (RSSI) are being discussed as a signal measurement value.

An operation and state performed when the UE in idle mode reselects a cell in step S160 will now be described in detail.

Basically, the UE can receive a normal service in a suitable cell. When the UE has not selected a suitable cell, the UE can receive only a limited service such as an emergency call from an acceptable cell. A description of the terms is as follows.

A. Acceptable cell
  not barred: whether a cell is acceptable or not is indicated as one bit through system information.
  when an acceptable state is designated, the acceptable cell satisfies a minimum signal characteristic value for selecting a cell (i.e., satisfies a minimum cell reselection criterion).

B. Suitable cell
  satisfies a condition of an acceptable cell.
  PLMN registered by a UE or PLMN to which a serving cell belongs.

To perform an operation for selecting the acceptable cell or suitable cell, a state of a UE may be defined. The state and operation of the UE are as follows.

A. 'Any Cell Selection' state: a state for attempting to camp on an acceptable cell.

B. 'Camped-on Any Cell' state: a state camped on an acceptable cell and a state for periodically attempting cell reselection for camping on a suitable cell. A limited service such as an emergency call can be received. When camped on a suitable cell, the 'Camped-on Any Cell' state transitions to 'Camped normally' state. The following operation is performed:
  receipt of a paging message
  receipt of system information
  measurement for cell reselection
  cell reselection
  periodic search of a suitable cell C. 'Camped normally' state: a state camped on a suitable cell. If a better suitable cell than a serving cell is found, cell reselection is performed. If another suitable cell is not found even though the serving cell does not satisfy a condition of a suitable cell (e.g., a signal characteristic value of the serving cell is lower than a threshold value), the 'Camped normally' state transitions to 'Any Cell Selection' state to search an acceptable cell. The following services can be performed:
  receipt of a paging message
  receipt of system information
  measurement for cell reselection
  cell reselection Being camped on a cell refers that a UE tunes a central frequency of the cell and use a control channel. Therefore, the UE can receive control information such as a paging message and system information from a camped-on cell. The UE can also perform a random access process or can request the eNode B of a radio resource control (RRC) connection.

A basic operation in FIG. 1 for the UE to reselect a cell according to signal characteristics has been described. In a LTE system, the following is considered as a case requiring cell selection:

UE capability
subscriber information
camp load balancing
traffic load balancing

UE capability refers to select a cell according to a frequency band which can be selected by a UE because the UE may have a limited available frequency band. The UE may be set to select or not to select a specific cell according to subscriber information or operator policy. Camp load balancing refers to select a cell which is being used by a small number of UEs in order to reduce data load generated when UEs in idle-mode are activated in a single cell. Similarly, traffic load balancing serves to change a cell in order to reduce data load generated by activated UEs.

Especially, a LTE system has a strong tendency toward expansion of a frequency band based on an existing universal terrestrial radio access network (UTRAN) for the purpose of installation/maintenance. UEs in the same cell share radio resources for communication, and thus load balancing between cells needs to be achieved in order to efficiently use the radio resources. Accordingly, camp/traffic load balancing is defined in the LTE system as an indispensable requirement.

In order to effectively achieve the above cell selection process in the LTE system, a priority may be defined with respect to frequencies or RATs so that a UE can select a specific frequency or RAT having the priority during cell selection or cell reselection. When a plurality of frequencies/RATs is present, the frequencies/RATs may have different priorities or the same priority. Alternatively, some of the frequencies/RATs may have the same priority. In the LTE system, only a frequency or RAT having a priority is defined to be selected during cell reselection.

DETAILED DESCRIPTION OF THE INVENTION

Technical Problems

If a UE receives a service from a Node B by selecting a cell having good signal characteristics, an error generated during data transmission and reception can be minimized, which directly relates to service quality.

However, in a LTE system, a Node B may set a cell of a specific frequency or RAT having low load as a high priority for the purpose of load balancing (or according to operator policy). Accordingly, if a signal characteristic value of a high priority cell exceeds a threshold value, the UE can reselect the cell which is set to have a high priority. Meanwhile, since a method using priority is not a method of selecting a cell having the highest signal characteristic value as in wideband code division multiple access (WCDMA), a data error rate generated during data transmission and reception may be increased compared with the WCDMA.

Although a Node B sets a cell having a specific frequency to have a low priority in order to prevent a UE from reselecting a corresponding frequency for a specific purpose (for example, load balancing), the UE which has not selected a cell of a frequency or RAT having a high priority may select a cell of a frequency having a low priority. Then if the UE in a low priority cell requests RRC connection, the Node B suppresses load through RRC connection rejection. However, since the method for the RRC connection rejection performs a RRC connection procedure once more after a specific standby time, uplink access for receiving a service is retarded.

Furthermore, a UE should attempt to periodically measure a high frequency in order to receive a service from a higher priority cell unless the UE receives a service from a cell of the highest priority frequency. Assuming that multiple cells which are geographically overlapped using multiple frequencies are operated, a UE which has not received a service from a cell of a frequency or RAT having the highest priority has increased burden according to an increase in frequencies.

An object of the present invention devised to solve the problem lies in providing a method of increasing use of radio resources in a wireless communication system and improving mobility of a UE.

Another object of the present invention lies in providing a method of efficiently performing cell reselection and a method of transmitting control information according to the cell reselection.

A further object of the present invention lies in providing a method of limiting cell reselection for a specific cell.

The technical problems to be solved by the present invention are not limited to the above description and it will be understood to those skilled in the art that other technical problems which have not been described will be appreciated from the following description.

Technical Solutions

The object of the present invention can be achieved by providing a method of performing cell reselection based on priorities by a user equipment (UE) in a wireless communication system, including selecting one or more candidate cells satisfying a first criterion associated with priorities among a serving cell and neighbor cells, camping on a cell satisfying a second criterion for cell reselection among the one or more candidate cells.

In another aspect of the present invention, provided herein is a method of performing cell reselection based on priorities in a wireless communication system, including determining whether or not a serving cell satisfies a first criterion associated with priorities, and if the serving cell satisfies the first criterion, triggering a cell reselection procedure only when a signal characteristic value of the serving cell is equal to or less than a specific value.

In a further aspect of the present invention, provided herein is a method of transmitting control information associated with cell reselection in a wireless communication system, including transmitting a first message indicating information associated with priorities used during the cell reselection, and transmitting a second message indicating a first criterion associated with priorities which should be satisfied by a serving cell and neighbor cells to be selected as a candidate cell.

Advantageous Effects

According to the exemplary embodiments of the present invention, the following effects are obtained.

First, use of radio resources in a wireless communication system is increased and mobility of a UE is improved.

Second, cell reselection is efficiently performed and related control information can be transmitted.

Third, cell reselection for a specific cell can be limited.

The effects which can be obtained by the present invention are not limited to the above description and it will be understood to those skilled in the art that other effects which have not been described will be appreciated from the following description.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Reference will now be made in detail to the exemplary embodiments of the present invention, examples of which are illustrated in the accompanying drawings. The following exemplary embodiments show examples in which technical features are applied to an evolved universal mobile telecommunications system (E-UMTS).

Figure 2:
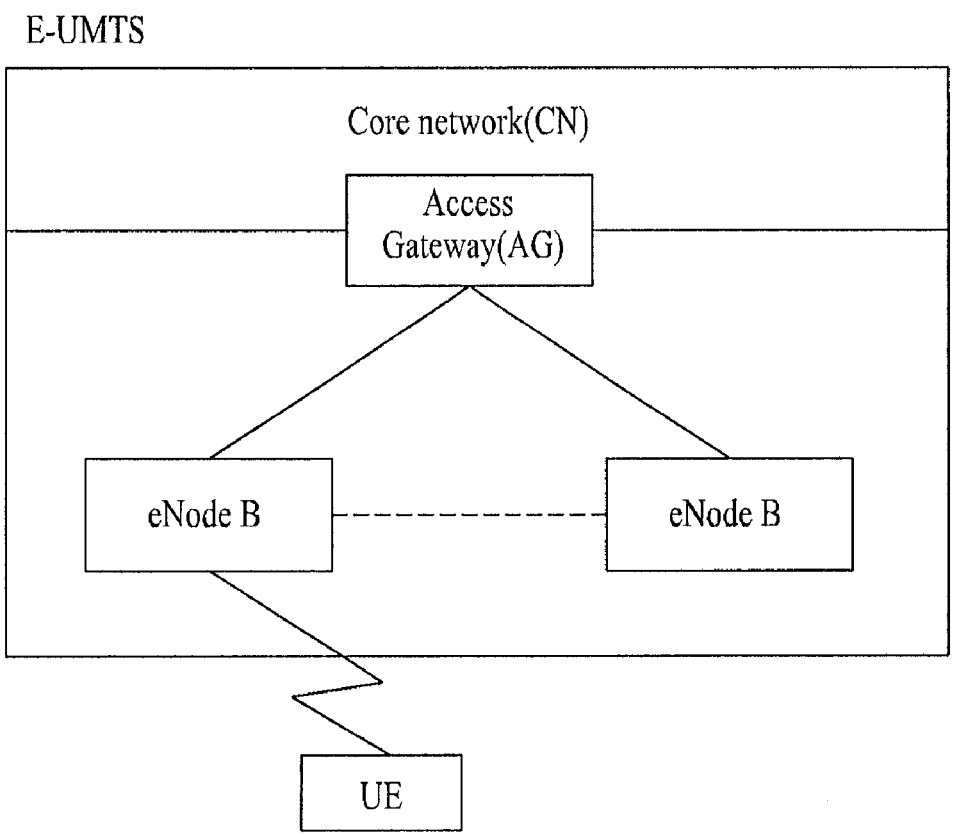
FIG. 2 illustrates a structure of a network of an E-UMTS.

FIG. 2 illustrates a network structure of the E-UMTS to which an embodiment of the present invention is applied. The E-UMTS system is an evolved version of the conventional WCDMA UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 2, the E-UMTS mainly includes a User Equipment (UE), a base station (or eNB or eNode B), and an Access Gateway (AG) which is located at an end of a network (E-UTRAN) and which is connected to an external network. Generally, an eNB can simultaneously transmit multiple data streams for a broadcast service, a multicast service and/or a unicast service. The AG can be divided into a part that handles processing of user traffic and a part that handles control traffic. Here, the AG part for processing new user traffic and the AG part for processing control traffic can communicate with each other using a new interface. One or more cells may exist for one eNB. An interface for transmitting user traffic or control traffic can be used between eNBs. A Core Network (CN) may include the AG and a network node or the like for user registration of the UE. An interface for discriminating between the E-UTRAN and the CN can be used. The AG manages mobility of a UE on a Tracking Area (TA) basis. One TA includes a plurality of cells. When the UE has moved from a specific TA to another TA, the UE notifies the AG that the TA where the UE is located has been changed.

Figure 3:
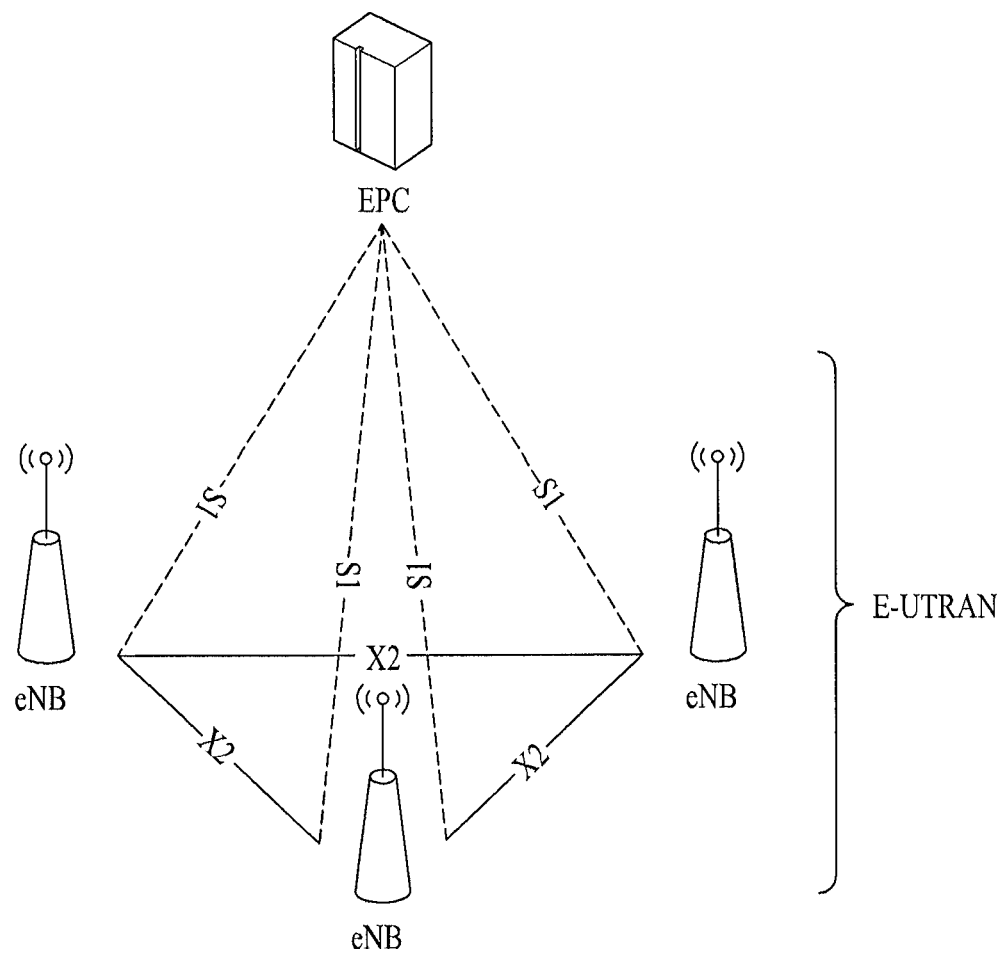
FIG. 3 illustrates a structure of an E-UTRAN.

FIG. 3 illustrates a network structure of an Evolved Universal Terrestrial Radio Access Network (E-UTRAN) system which is a mobile communication system to which the embodiment of the present invention is applied. The E-UTRAN system is an evolved version of the conventional UTRAN system. The E-UTRAN includes a base station that will also be referred to as "eNode B" or "eNB". The eNBs are connected through an X2 interface. Each eNB is connected to the User Equipment (UE) through a radio interface and is connected to an Evolved Packet Core (EPC) through an Si interface.

Figure 4A:
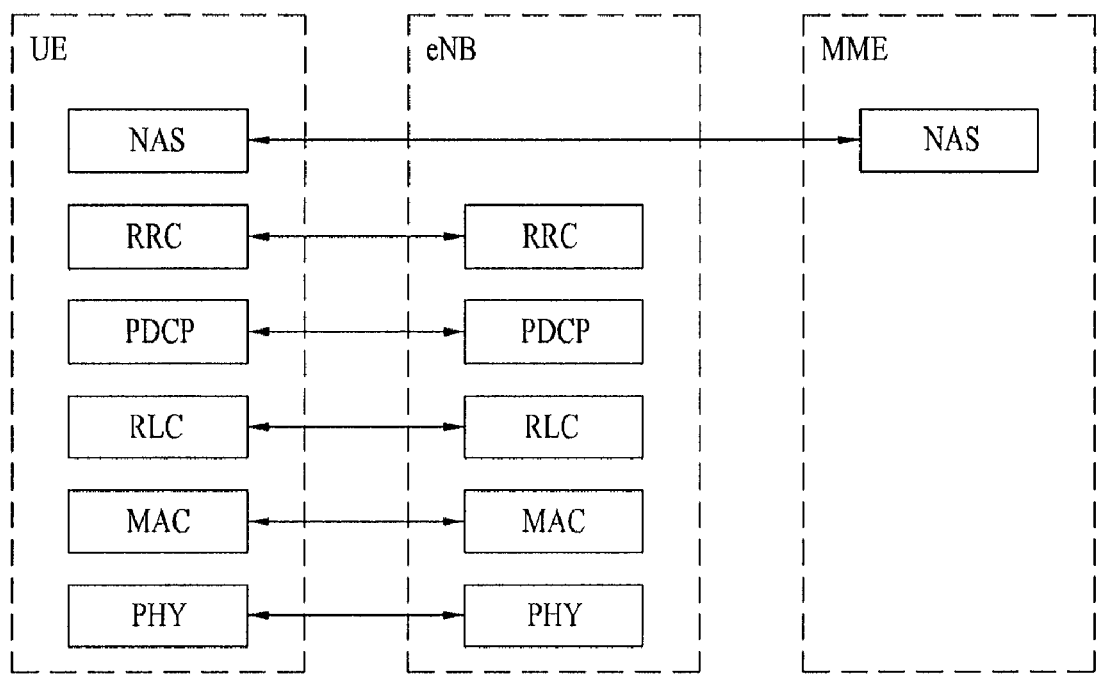
FIGS. 4A and 4B illustrate structures of a control plane and a user plane, respectively, of a radio interface protocol between a UE and an E-UTRAN.
Figure 4B:
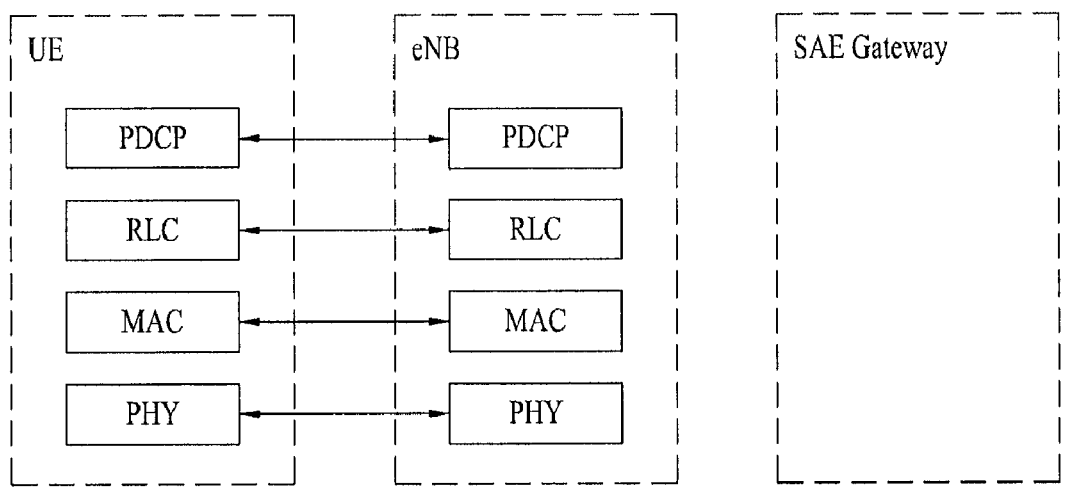

FIGS. 4A and 4B illustrate the configurations of a control plane and a user plane of a radio interface protocol between a UE and a UMTS Terrestrial Radio Access Network (UTRAN) based on the 3GPP radio access network standard. The radio interface protocol is divided horizontally into a physical layer, a data link layer and a network layer, and vertically into a user plane for data transmission and a control plane for signaling. The protocol layers of FIGS. 4A and 4B can be divided into a L1 layer (first layer), a L2 layer (second layer) and a L3 layer (third layer) based on the lower three layers of the Open System Interconnection (OSI) reference model widely known in communication systems. The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The physical layer, which is the first layer, provides an information transfer service to an upper layer using a physical channel. The physical layer is connected to a Media Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. The physical channel is modulated according to the Orthogonal Frequency Division Multiplexing (OFDM) method, using time and frequencies as radio resources.

The MAC layer of the second layer provides a service to a Radio Link Control (RLC) layer, located above the MAC layer, through a logical channel. The RLC layer of the second layer supports data transmission with reliability. The functions of the RLC layer may also be implemented through internal functional blocks of the MAC layer. In this case, the RLC layer need not exist. A PDCP layer of the second layer performs a header compression function to reduce unnecessary control information in order to efficiently transmit IP packets such as IPv4 or IPv6 packets in a radio interface with a relatively narrow bandwidth.

A Radio Resource Control (RRC) layer located at the lowermost of the third layer is defined only in the control plane and is responsible for control of logical, transport, and physical channels in association with configuration, re-configuration and release of Radio Bearers (RBs). The RB is a service that the second layer provides for data communication between the UE and the UTRAN. To accomplish this, the RRC layer of the UE and the RRC layer of the network exchange RRC messages. The UE is in RRC connected mode if RRC connection has been established between the RRC layer of the radio network and the RRC layer of the UE. Otherwise, the UE is in RRC idle mode.

A Non-Access Stratum (NAS) layer located above the RRC layer performs functions such as session management and mobility management.

One cell of the eNB is set to use a bandwidth such as 1.25, 2.5, 5, 10 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages and a downlink Shared Channel (SCH) for transmission of user traffic or control messages. User traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Logical channels, which are located above the transport channels and are mapped to the transport channels, include a Broadcast Control Channel (BCCH), a Paging Control Channel (PCCH), a Common Control Channel (CCCH), a Multicast Control Channel (MCCH) and a Multicast Traffic Channel (MTCH).

Figure 5:
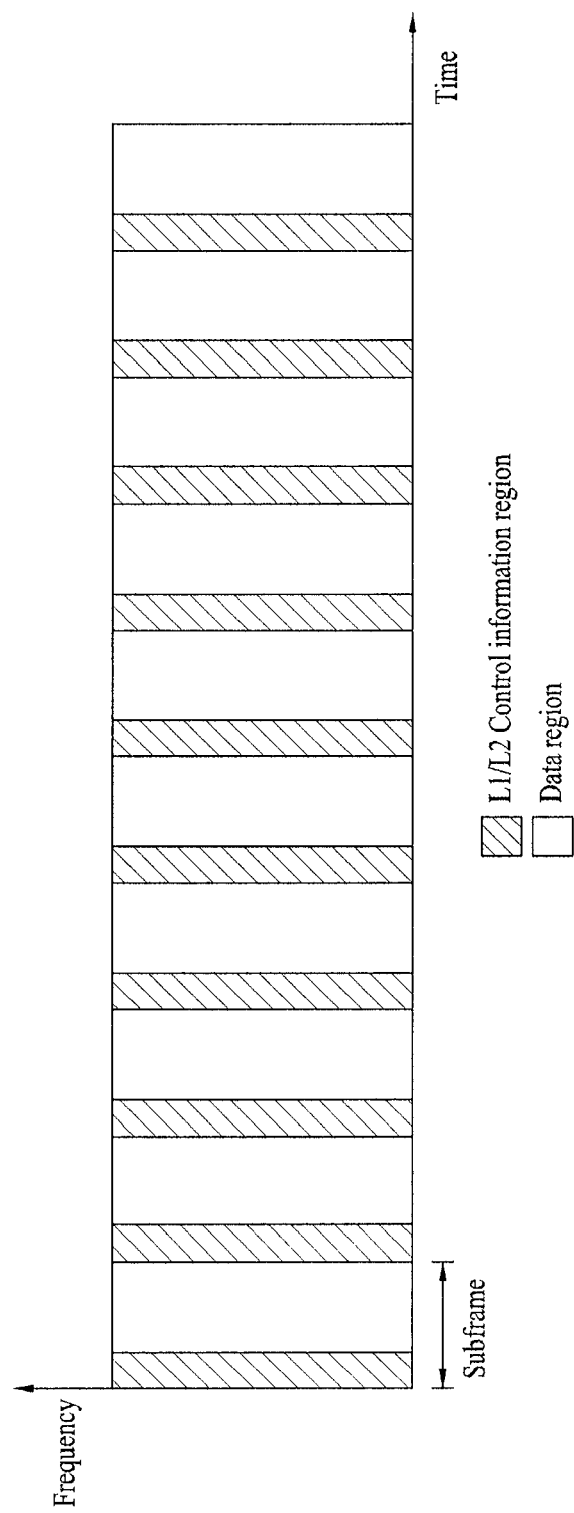
FIG. 5 illustrates an example of a structure of a physical channel used in an E-UMTS.
Figure 6:
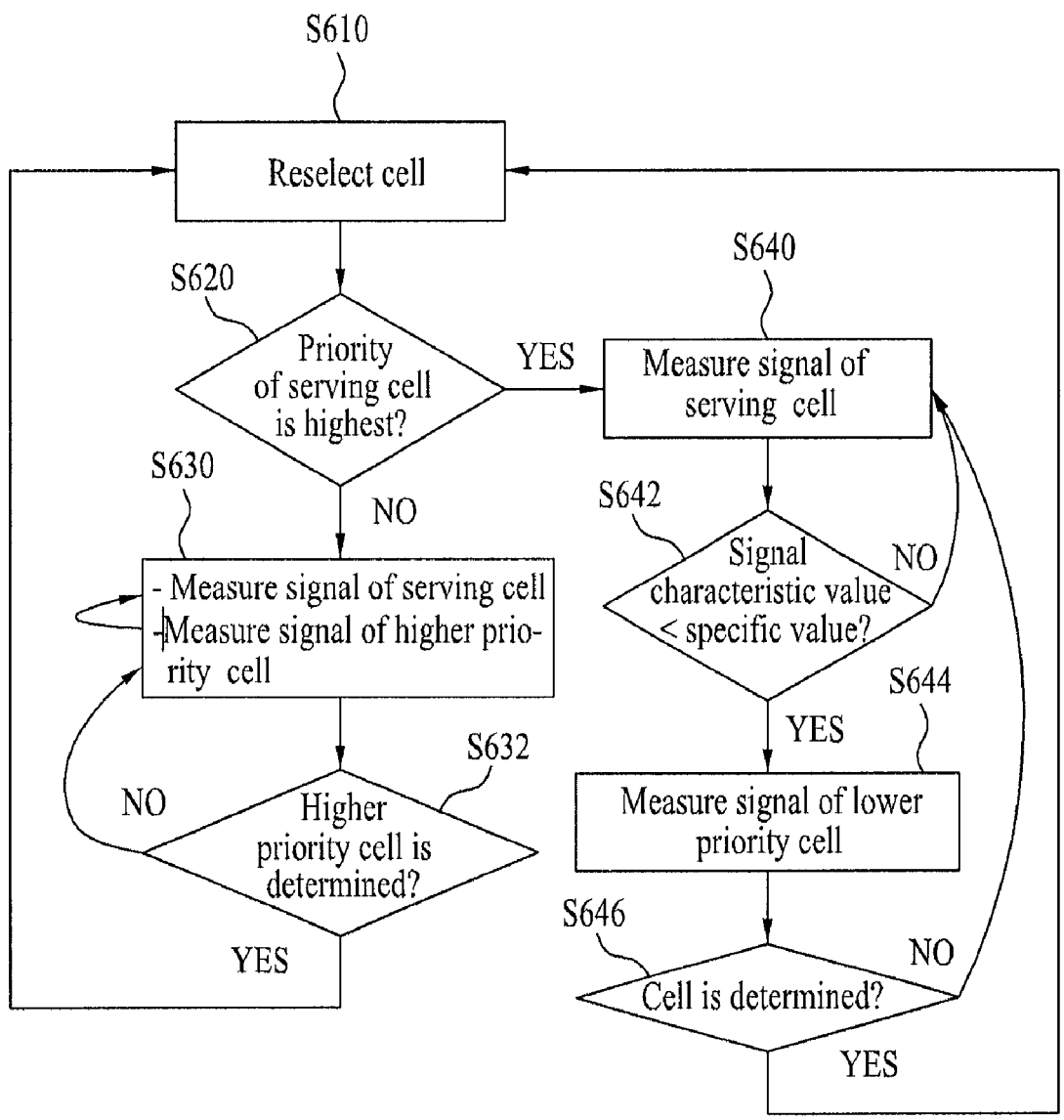
FIG. 6 illustrates a method for a UE in idle mode to reselect a cell according to priorities.

FIG. 5 illustrates an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 6, an L1/L2 control information transmission area (PDCCH) and a data transmission area (PDSCH) are shown. In the E-UMTS system which is currently being discussed, a radio frame of 10 ms is used and one radio frame includes 10 subframes. In addition, one subframe includes two consecutive slots. The length of one slot is 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, it is assumed that a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Process for Reselecting a Cell Using Priority

FIG. 6 illustrates an example of a method of reselecting a cell according to priorities when priorities of frequencies or RATs are defined. If priorities of different frequencies and different RATs are defined, a UE selects a cell corresponding to a frequency or RAT having a high priority within a range satisfying a minimum signal characteristic value or a specific threshold value defined in a system. However, the UE may select, during initial cell selection, a cell having the highest signal characteristic value without considering a priority.

Referring to FIG. 6, when a UE is served by the highest priority cell (step S620), if a signal characteristic value of a serving cell is equal to or greater than a specific value (e.g., $S_{nonintrasearch}$) since measurement for a low priority cell may not be performed, power consumption can be effectively reduced (steps S640 and S642). Meanwhile, even though the priority of the serving cell is the highest, if the signal characteristic value of the serving cell is lower than the specific value, the UE may select another low priority cell satisfying the specific signal characteristic value through a measurement process (steps S644 and S646). If multiple cells satisfying the specific value are present, a cell satisfying a specific condition, for example, the highest priority cell or a cell having the highest signal characteristic value may be selected (step S646).

Meanwhile, if the UE does not select a cell having a frequency and/or RAT of the highest priority, that is, if the UE selects a low priority cell (step 620), even though the signal characteristic value of the serving cell is equal to or greater than the specific value (e.g., $S_{nonintrasearch}$), the UE periodically searches a cell using a frequency and/or RAT of the highest priority (steps S630 and S632). A period searching another cell may implicitly determined between a Node B and a UE. Alternatively, or the Node B or UE may inform the other party of the period.

Hereinafter, a process for reselecting a cell according to priorities will be described in detail.

First, when the UE reselects another cell having the same priority as the serving cell, the UE reselects a cell having the highest signal characteristic value through a ranking procedure for comparing signal strength and quality.

For the ranking procedure between cells having the same priority, the following equation is used:

$$R_s = Q_{meas,s} + Qhyst_s$$

$$R_n = Q_{meas,n} - Qoffset$$

Here, $Q_{meas,s}$ denotes a RSRP value measured for the serving cell by the UE, $Q_{meas,n}$ denotes a RSRP value measured for neighbor cells by the UE, $Qhyst_s$ denotes a hysteresis value for weighting the serving cell, and Qoffset denotes at least one of a bias value between cells and a bias value between different frequencies.

In the ranking procedure, if a cell having the highest signal characteristic value satisfies $R_n > R_s$ for a specific time $Treselection_{EUTRAN}$, the UE selects a cell corresponding to $R_n$. Namely, the UE reselects a cell having the best signal characteristic among cells having better signal characteristics than the serving cell. In a conventional WCDMA, a cell having the highest signal characteristic value is reselected through the ranking procedure without using priority information about a frequency or RAT.

The value of Treselection is used to impose a restriction time duration for which the cell reselection criterion should be satisfied in order to prevent the UE from repeatedly selecting a certain cell. And, the value of Treselection is transmitted from a Node B to the UE via the SI. In the intra-frequency cell reselection and the inter-frequency cell reselection, a value of $Treselection_{EUTRAN}$ is used. In the inter-RAT cell reselection, $Treselection_{UTRAN}$ is used to reselect a WCDMA cell and $Treselection_{GERAN}$ is used to reselect a GSM cell. That is, the restriction time duration is defined per RAT such that the different restriction times are respectively applied to different RATS. Hereinafter, TreselectionRAT is used for representing the restriction time duration for cell reselection from the serving cell to a target cell, regardless of RAT.

Figure 7:
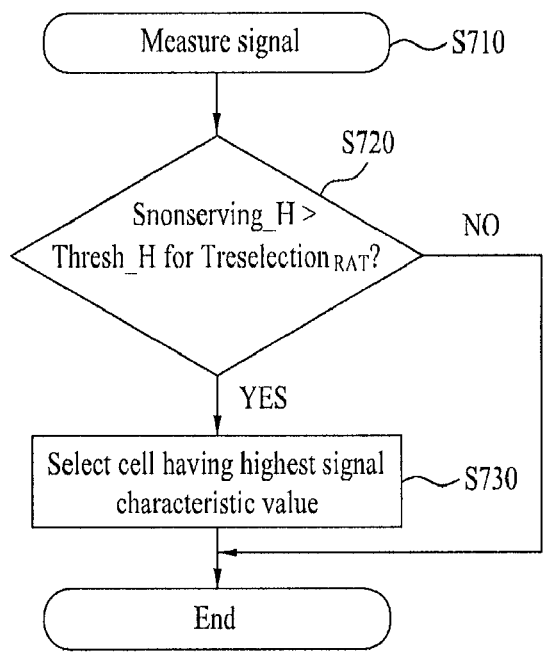
FIG. 7 illustrates a method of reselecting a higher priority cell than a serving cell.

FIG. 7 is a flow chart illustrating a method of reselecting a higher priority cell than a serving cell. A method of reselecting a cell corresponding to a frequency or RAT of a higher priority than a frequency or RAT of the serving cell in the process of FIG. 6 will be described with reference to FIG. 7. Referring to FIG. 7, a UE selects a cell which satisfies a condition that a signal characteristic value (e.g., Snonserving_H) of a cell corresponding to a frequency or RAT of a higher priority than a frequency or RAT of the serving cell is greater than a specific threshold value (e.g., Thresh_H) for a specific time TreselectionRAT (S710 and S720). A cell of a frequency or RAT of the highest priority is selected from corresponding cells. If a plurality of cells has the same priority, a cell having the highest signal characteristic value is selected according to a ranking procedure (step S730).

Figure 8:
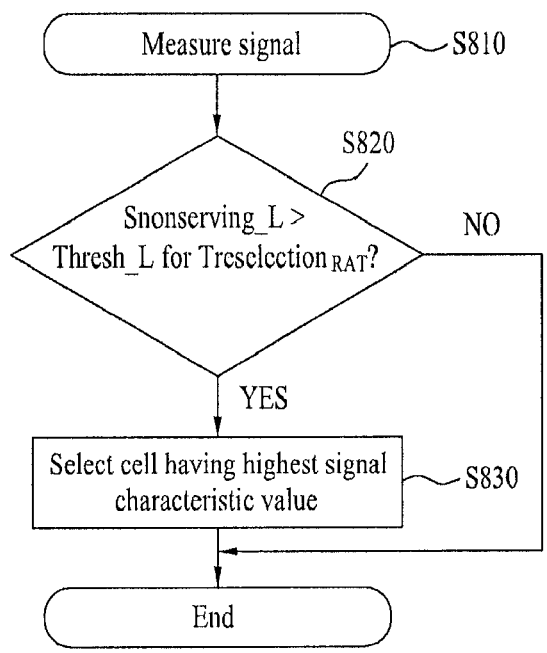
FIG. 8 illustrates a method of reselecting a lower priority cell than a serving cell.

FIG. 8 is a flow chart illustrating a method of reselecting a lower priority cell than a serving cell. A method of reselecting a cell corresponding to a frequency or RAT of a lower priority than a frequency or RAT of the serving cell in the process of FIG. 6 will be described with reference to FIG. 8. When a UE does not find a higher priority cell than the serving cell, if a signal characteristic value of the serving cell is less than a specific threshold value (e.g., Sserving<Threshold), the UE reselects a cell of a frequency or RAT having a lower priority than the serving cell. At this time, the UE reselects a cell which satisfies the condition that a signal characteristic value (e.g., Snonserving_L) of cells corresponding to a frequency or RAT of a lower priority than the serving cell is greater than a specific threshold value (e.g., Thresh_L) for a specific time TreselectionRAT (steps S810 to S830).

Next, a method of controlling load of a cell in a LTE system will be described.

First, a Node B sets a frequency having high load to a low priority so that a cell of a frequency having a high priority can serve a UE, and therefore, load balancing between cells can be adjusted. However, a specific signal characteristic value of a cell using a frequency of a high priority should satisfy a prescribed level. If this condition is not satisfied, since a cell using a frequency of a low priority should be reselected, the load balancing only using a priority has limitations.

Second, in the LTE system, if load of a specific cell managed by the Node B is high and thus it is difficult to provide a service to a UE newly demanding the service, the eNB does not accept a RRC connection request transmitted by the UE for a service request, by transmitting a RRC connection reject message to the UE. In this case, the Node B causes the UE to retransmit the RRC connection request after a designated wait time (in a conventional WCDMA system, frequency or RAT information may also be designated. That is, redirection information may be additionally designated so that a cell of a corresponding frequency or RAT can be found).

Figure 9:
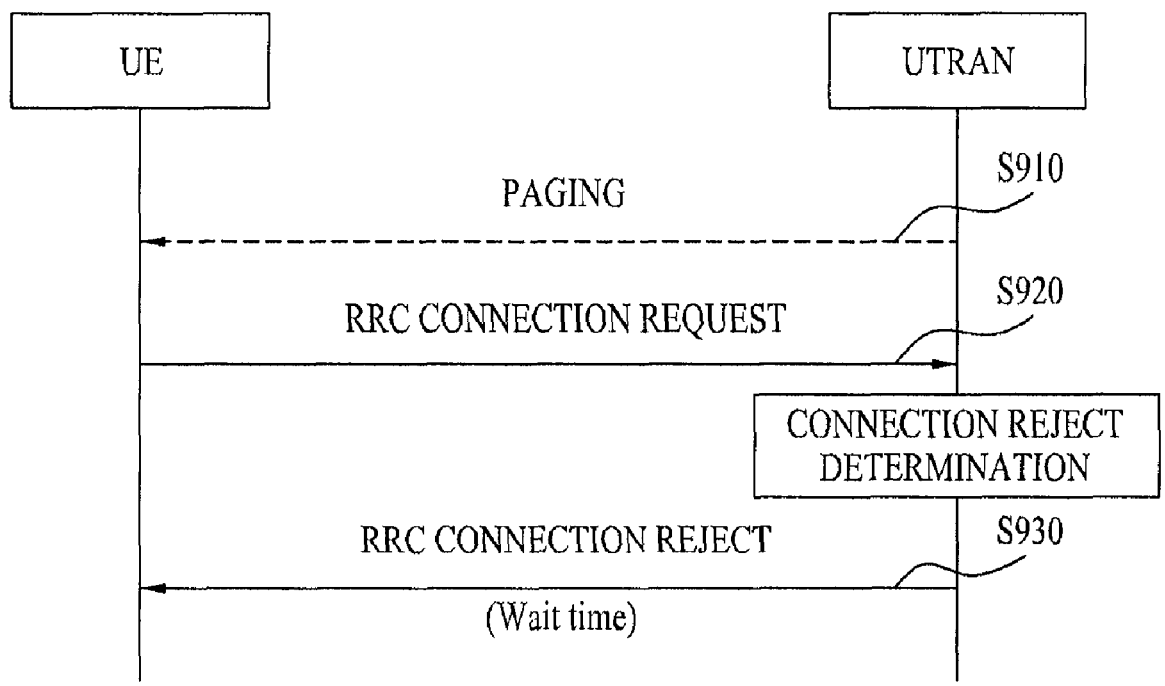
FIG. 9 illustrates a method of rejecting a connection request of a UE and designating a wait time to the UE to adjust load in an E-UTRAN.

FIG. 9 illustrates a method of rejecting a connection request of a UE and designating a wait time to the UE to adjust load in a LTE system.

Referring to FIG. 9, a paging message is used when a UTRAN informs a UE of a service (an incoming call to the UE) (step S910). The UE transmits a RRC connection request to the UTRAN to receive a service from the UTRAN (step S920). If the UE desires to use a specific service instead of receiving a paging service from the UTRAN and thus the UE transmits a RRC connection request message for a service request to the network, the paging procedure of step S910 is omitted. If the RRC connection request is frequent or if an uplink connection of the UE needs to be suppressed, a radio network sets a wait time and transmits a RRC connection reject message to control load of a cell by suppressing the uplink connection of a specific UE for a specific time (step S930). The UE can restart a service request through a RRC connection setup process after a designated wait time.

Embodiment 1

Introduction of a Cell Priority

Cell reselection according to priorities of a frequency or RAT has the following advantages. First, according to an absolute priority, a rule of signal measurement/cell reselection may be simplified. Second, if a UE is camped on a cell using a frequency or RAT of the highest priority satisfying a prescribed condition (e.g., S_intra_frequency), since the UE does not need to measure another frequency or RAT, power consumption is reduced.

However, it may be difficult to reflect actual load of a cell only by defining priority for a frequency or RAT. For example, it is assumed that a cell A uses a frequency of priority 1 and a cell B uses a frequency of priority 3. In terms of load, if the cell A has high load and the cell B has low load, the UE will reselect the cell A having the highest priority during cell reselection. However, if load is considered, it is favorable to select the cell B. A service such as a multimedia broadcast multicast service (MBMS) may be limited in some cells. Accordingly, a UE which desires to receive the MBMS needs to reselect a proper cell.

For such a reason, the present invention proposes use of a cell priority in addition to a frequency/RAT priority. The cell priority indicates a priority defined in units of a cell and may be called a cell-specific priority.

Cell reselection based on priorities according to the exemplary embodiment of the present invention is performed using a frequency priority, a RAT priority, a cell priority, and a combination thereof, which will be referred to as a 'priority' for brevity. Various types of priorities may be defined with respect to one cell. In this case, if the cell priority is defined, the cell priority may be first applied during the cell reselection. If the cell priority is not defined, a priority defined by a combination of a frequency/RAT may be first applied.

A network may determine criteria of priorities to satisfy the following various purposes. Furthermore, the following purposes may be cases where a UE demands a cell selection process.

- Quality of service (QoS) provided to a UE: Priorities are set according to QoS or service type provided to a UE. For example, for a UE using only voice over Internet protocol (VoIP), a high priority may be set to a frequency/RAT/cell related to the VoIP. As another example, for a UE using a service demanding a high data rate, a high priority may be set to a RAT providing a high data rate (e.g., E-UTRAN). For a UE using a MEMS, a high priority may be set to a frequency/RAT/cell providing the MBMS.
- Network sharing: Different PLMNs are shared to provide a service to a UE. A priority for a frequency/RAT/cell may be determined for a UE to select a cell provided by an accessible PLMN.
- Subscribed type: Priorities are determined according to subscriber information. For example, for a service user of voice communication demanding a low rate, a high priority may be set to a RAT having a low rate (e.g., UTRAN) and a low priority may be set to a RAT having a high rate (e.g., E-UTRAN). As another example, for a user of a multimedia service demanding a high data rate, a high priority may be set to a RAT having a high rate (e.g., E-UTRAN) and a low priority may be set to a RAT having a low rate (e.g., UTRAN).
- Closed subscriber group (CSG) or home Node B: A CSG cell is a cell which can be used only by one or more specific users or UEs. For specific UEs accessible to the CSG cell, a high priority may be set to a frequency/RAT/cell related to the CSG. A home Node B which is installed at, for example, home may be one example of the CSG.
- Load balancing: The above-described camp/traffic loading balancing is included in the load balancing. For example, a high priority is set to a frequency/RAT/cell having low load so that a UE can first select a cell having low load for load balancing between cells. According to a range of an area to which frequency/RAT/cell priorities are applied, load balancing may be possible in units of a cell, a tracking area, a registration area comprised of a plurality of tracking areas, and a PLMN.
- Operator policy: In addition to the above-described criteria, a high priority may be set to a specific frequency/RAT/cell according to policy of a network operator.

Validity and applied range/scope of priority information of the frequency/RAT/cell applied to a UE are as follows.

- Validity of a priority is determined in units of a tracking area and the priority is not changed prior to a tracking area update (TAU; a process of registering identity information such as IMSI in a network). For example, in a TAU process, a priority allocated in a previous TAU process may be invalidated. If priority information is received from a network during the TAU process or after the TAU process, the priority is valid until the next TAU.
- Validity of a priority is determined in units of a cell and the priority is not changed before another cell is reselected. For example, if a serving cell is changed, a previously allocated priority may be invalidated. If priority is received from a network through system information during a cell reselection process or after the cell reselection process, the priority is valid until the next cell reselection or until the system information is received after the next cell reselection.
- Validity or applicable range of a priority may be determined in units of a PLMN.
- Validity or applicable range of a priority may be determined in units of a PLMN registered by a UE, that is, a registered PLMN (RPLMN).

Moreover, when state of a UE transitions to a connected mode from an idle mode, priority information may be invalidated. Namely, a priority may be invalidated by a specific RRC signal for causing the UE to transition to the connected mode from the idle mode. For example, a priority may be invalidated when transmitting a RRC connection request by the UE, receiving RRC connection setup from a Node B or transmitting RRC connection complete to the Node B. Contrarily, when the UE transitions to the idle mode from the connected mode, priority information may be invalidated. Namely, a priority may be invalidated by a specific RRC signal for causing the UE to transition to the idle mode from the connected mode. For example, a priority may be invalidated by a RRC connection release.

The UE can receive priorities from the Node B by the following methods.

- The UE receives selectable frequency/RAT information and priority information thereof from the Node B during TAU.
- The UE receives selectable frequency/RAT information from the Node B during TAU. Thereafter, the UE receives priority information about specific frequency/RAT through system information.
- The UE receives selectable frequency/RAT information and priority information thereof through system information. The UE may also receive priority information about a neighbor cell together with a neighbor cell list (NCL) through the system information.
- The UE may receive frequency/RAT/cell information and priority information thereof through a RRC signal. The RRC signal may be a signal related to RRC Connection Release, RRC Connection Request, RRC Connection Setup, Radio Bearer Setup, Radio Bearer Reconfiguration, RRC Connection Reconfiguration, or RRC Connection Re-establishment.
- The UE may receive frequency/RAT/cell information and priority information thereof through L1/L2 control signaling and PDCP/RLC/MAC protocol data units (PDUs).

The UE may receive priority information from a network using at least one of the above-described methods. The priority information for a frequency/RAT/cell received by different methods may be the same or may be different. If the UE repeatedly receives priorities by different methods, a priority received by a specific method may have priority over a priority received by other methods. For example, the UE may receive priority through system information and then may further receive the priority through RRC connection release. At this time, the UE disregards the priority received through the system information and may perform measurement and cell reselection according to the priority received through the RRC connection release. Next, the UE in idle mode may be RRC-connected to the Node B to receive a service from the Node B and, during this process, the UE can invalidate the priority previously received through RRC connection release. In addition, if the UE cannot receive the priority from the network at RRC connection release after receiving the service from the Node B, the UE which is returned to the idle mode may perform the cell reselection using the priority before the RRC connection or perform the cell reselection using the priority newly received from the SI.

Under the state that the UE knows priority for each frequency/RAT, the UE can recognize existence of each frequency or RAT exists from a neighbor cell list received through the system information. The UE may determine a priority of each cell using the priority of a frequency/RAT and the neighbor cell list. The UE may perform cell reselection using the priority of each cell after receiving the priority of the cell from the Node B. Furthermore, the UE may detect whether another frequency or RAT exists by scanning process even though the neighbor cell list is not present.

Embodiment 2

Cell Reselection Using a First Criterion for Priorities

To efficiently use radio resources and to improve mobility of a UE, the exemplary embodiment of the present invention proposes the following methods.

First, if a serving cell does not have the highest priority but satisfies a sufficient priority and signal characteristics, a cell reselection process is not triggered.

Second, a specific cell is restricted so that a UE may not select the cell for a specific purpose in a cell reselection process. For example, the specific cell may be a cell which is difficult to provide a service due to overload or a cell which does not support a service such as a MBMS.

Third, if a sufficient priority is guaranteed, a UE can receive a service in a cell having good signal characteristics.

To this end, the exemplary embodiment of the present invention proposes to use a first criterion for priorities during cell reselection. The first criterion may be related to a frequency priority, a RAT priority, a cell priority, or a combination thereof. The first criterion may desirably be a minimum priority (MIN_P) which should be satisfied by a cell during cell reselection.

The first criterion is used for two purposes in the exemplary embodiment of the present invention.

First, the first criterion is used to trigger a cell reselection process (hereinafter, referred to as 'trigger purpose'). In this case, the UE determines whether the serving cell satisfies the first criterion. When the serving cell satisfies the first criterion, if a signal characteristic value of the serving cell satisfies a prescribed condition even though the serving cell is not the highest priority, the cell reselection process is not triggered. If the serving cell does not satisfy the first criterion, the UE can trigger the cell reselection process irrespective of a signal characteristic value of the serving cell.

Second, the first criterion is used to restrict a specific cell (hereinafter, referred to as 'restriction purpose') so that the UE may not select the cell during a cell reselection process. In this case, the UE selects candidate cells satisfying the first criterion among the serving cell and neighbor cells. Next, the UE is camped on a cell satisfying a second criterion for cell reselection among the candidate cells. Namely, a specific cell is restricted using the first criterion so that the UE may not select the cell in a cell reselection process, and the cell reselection process is performed with respect to the other cells. For example, the cell reselection process is performed with respect to cells having priorities equal to or higher than MIN_P.

Figure 1:
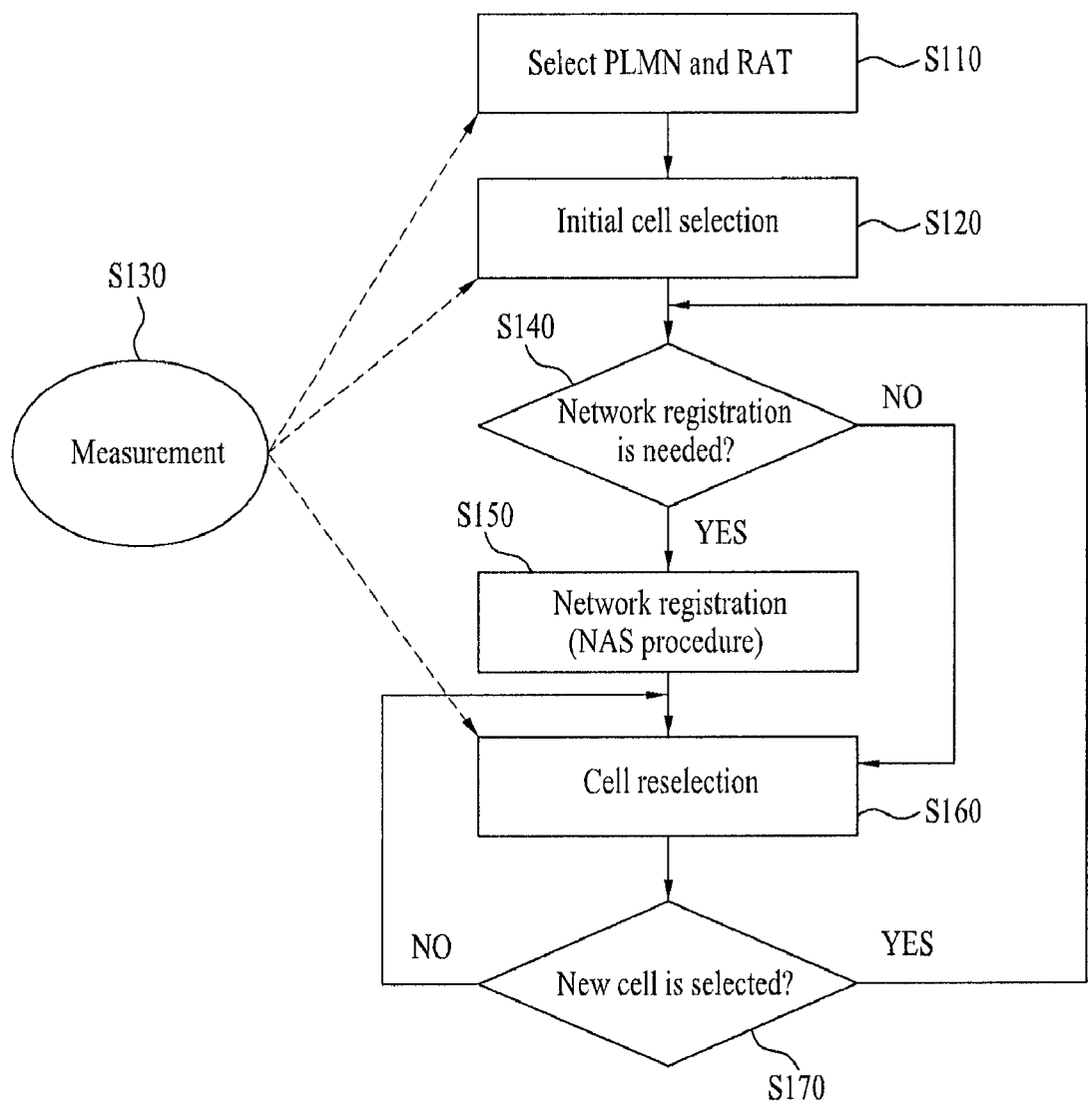
FIG. 1 illustrates a procedure for selecting a cell by a UE in idle mode.

The first criterion may also be used together with the 'trigger purpose/restriction purpose' as a criterion for distinguishing between a suitable cell and an acceptable cell in relation to cell reselection. Specifically, the UE determines a cell satisfying not only the suitable cell criterion described in conjunction with FIG. 1 but also the first criterion as a suitable cell. If the UE is camped on the suitable cell, the UE transitions to the 'Camped normally' state described in FIG. 1 to perform operation in the 'Camped normally' state. If the UE does not reselect a cell satisfying the first criterion, the UE transitions to the 'Any Cell Selection' state to attempt to be camped on an acceptable cell or a suitable cell. Specifically, if the UE reselects a cell which does not satisfy the first criterion, the UE transitions to the 'Camped on Any Cell' state to perform operation (for example, periodic search of a suitable cell) in that state. In the exemplary embodiment of the present invention, a UE receiving a service in a suitable cell, that is, a UE camped on a suitable cell may omit measurement for a cell which does not satisfy the first criterion. If a UE has not selected a cell satisfying the first criterion, the UE may transition to the 'Any Cell Selection' state and may perform operation for additionally measuring a cell which does not satisfy the first criterion.

The second criterion is a common criterion for cell reselection. The second criterion may be used for cell reselection according to priorities and for cell reselection disregarding the priorities. The second criterion is basically the same as that described in FIG. 6 to FIG. 8.

1. Cell Reselection According to Priorities

The highest priority cell satisfying a specific signal characteristic value is reselected with respect to candidate cells satisfying the first criterion.

2. Cell Reselection Disregarding Priorities

A cell having good signal characteristics is selected irrespective of priorities from candidate cells satisfying the first criterion. For example, a cell having good signal characteristics is selected by a ranking procedure. In this case, if a signal characteristic value of a serving cell is higher than a specific threshold value, operation for measuring a higher priority cell may not be performed. That is, only when a signal characteristic value of a serving cell is less than a threshold value, measurement for cell reselection may be performed.

A UE may receive an indication as to whether to perform cell reselection according to priorities or cell reselection disregarding priorities from a Node B. For instance, if the UE receives a first criterion (e.g., a minimum priority) for priorities from the Node B, the UE may perform cell reselection disregarding priorities. As another example, any indication information (e.g., bit indicator) may be used to determine whether to perform cell reselection according to priorities or cell reselection disregarding priorities.

Figure 10:
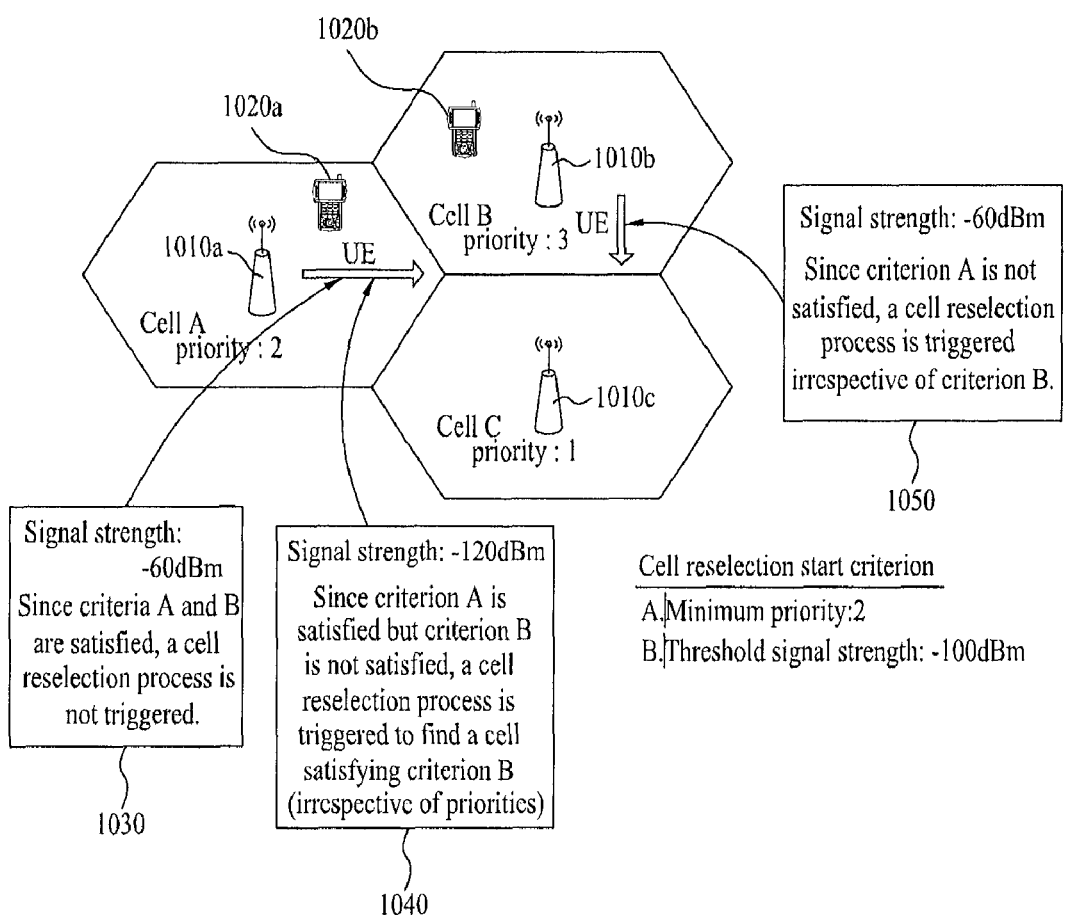
FIG. 10 is a conceptual view illustrating triggering of cell reselection according to an exemplary embodiment of the present invention.

FIG. 10 is a conceptual view when the first criterion is used for 'trigger purpose'.

Referring to FIG. 10, there are cells A, B, and C and the respective cells A, B, and C provide a service in corresponding Node Bs 101a, 1010b, and 1010c. Each Node B may use different frequencies and/or RATs. The cells A, B, and C have priorities 2, 3, and 1, respectively. The priorities may be frequency priorities, RAT priorities, cell priorities, or a combination thereof. UEs 1020a and 1020b are illustrated in the cells A and B, respectively. The UEs 1020a and 1020b receive a service from the cells A and B, respectively. FIG. 10 assumes: A. a minimum priority of 2; and B. a threshold signal strength of −100 dBm as a criterion for triggering cell reselection.

The UE 1020a in the cell A and the UE 1020b in the cell B move towards a cell boundary. The cell A, which is a serving cell, has a priority of 2 and the UE 1020a in the cell A satisfies the criterion A for the minimum priority. Therefore, the UE 1020a determines whether to trigger cell reselection by comparing a signal strength with the threshold signal strength wile moving to the cell boundary. If the UE 1020a is in the vicinity of the center of the cell A, a signal strength thereof is −60 dBm which is higher than the threshold signal strength of −100 dBm (step 1030). Since the UE 1020*a* satisfies both the criterion A and the criterion B, the UE 1020*a* does not trigger a cell reselection process. Meanwhile, if a signal strength is lowered to −120 dBm while the UE 1020*a* approaches the cell boundary, the UE 1020*a* does not satisfy the criterion B (step 1040). Accordingly, the UE 1020*a* triggers the cell reselection process. The UE 1020*a* may select a cell satisfying the criterion A after selecting a cell satisfying the criterion B for the signal strength. Conversely, the UE 1020*a* may select a cell satisfying the criterion B after selecting a cell satisfying the criterion A.

The UE 1020*b* determines whether a priority of the serving cell satisfies the minimum priority as a prerequisite condition for triggering cell reselection while approaching to the cell boundary. The cell B has the priority of 3 which is lower than the minimum priority of 2. Therefore, the cell B does not satisfy the criterion A for the minimum priority. In this case, the UE 1020*b* triggers the cell reselection process irrespective of a signal strength even though the signal strength of −60 dBm is greater than the threshold signal strength of −100 dBm (step 1050).

When the minimum priority, MIN_P, is used as a criterion for discriminating between a suitable cell and an acceptable cell, a UE determines the cell A as a suitable cell and determines the cell B as an acceptable cell. Hence, according to the exemplary embodiment of the present invention, if a UE receiving a service in a suitable cell satisfies a prescribed condition of a signal characteristic value, measurement for cell reselection may be omitted.

Figure 11A:
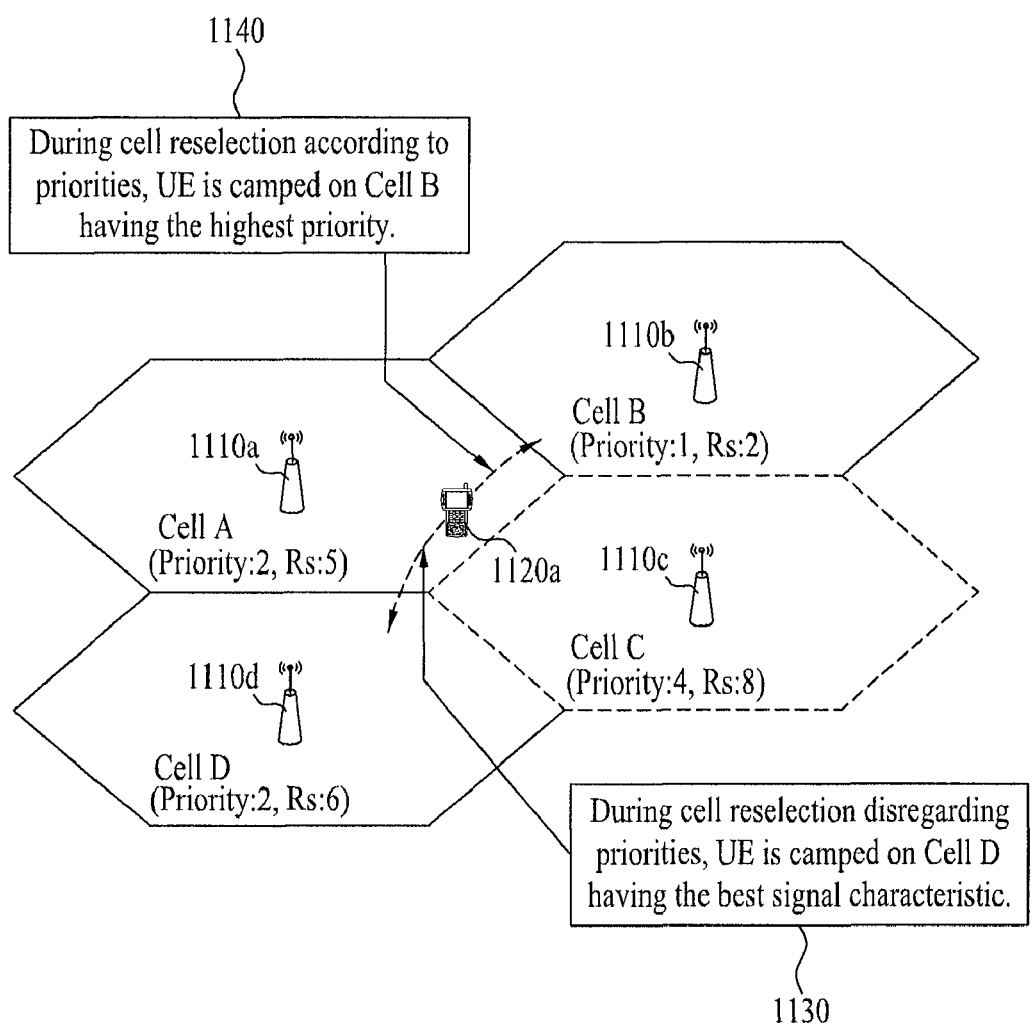
FIGS. 11A and 11B are conceptual views illustrating a process for performing cell reselection according to another exemplary embodiment of the present invention.

FIG. 11A is a conceptual view when the first criterion is used for 'restriction purpose'.

Referring to FIG. 11A, there are cells A to D and the respective cells A to D provide a service in corresponding Node Bs 1110*a* to 1110*d*. The respective Node Bs may use different frequencies and/or RATs. The cells A to D have priorities 2, 2, 4, and 2, respectively. The priorities may be frequency priorities, RAT priorities, cell priorities, or a combination thereof. The cells A to D have signal characteristic values of 5, 2, 8, and 6, respectively. A UE 1120*a* receives a service from the cell A in a cell boundary. Although not shown in the drawing, it is assumed that a minimum priority, MIN_P, in FIG. 11A is 2.

Under such a circumstance, since a signal characteristic value of the UE 1120*a* in the boundary of the cell A is less than a specific value (e.g., $S_{intersearch}$) a cell reselection process is triggered. The UE 1120*a* performs the cell reselection process with respect to the cells A, B, and D except the cell C which does not satisfy MIN_P. To denote that the cell C is excluded from the cell reselection process, a boundary of the cell C is indicated by dotted lines. If the MIN_P is used for a criterion for discriminating between a suitable cell and an acceptable cell, the UE 1120*a* determines the cells A, B, and D as suitable cells and determines the cell C as an acceptable cell.

The cell reselection process is a process for selecting a cell having a high priority or a cell having good signal characteristics. If cell reselection is performed according to priorities, the UE 1120*a* is camped on the highest priority cell B (priority: 1) (step 1140). If cell reselection disregarding priorities is performed, the UE 1120*a* is camped on the cell D having the best signal characteristic (Rs: 6) (step 1130).

If the MIN_P is used as a criterion for discriminating between a suitable cell and an acceptable cell, a UE camped on the suitable cell B or D transitions to the 'Camped normally' state. However, if the cells A, B, and D do not satisfy a prescribed criterion, the UE transitions to the 'Any Cell Selection' state and attempts to camp on any acceptable cell or suitable cell.

Figure 11B:
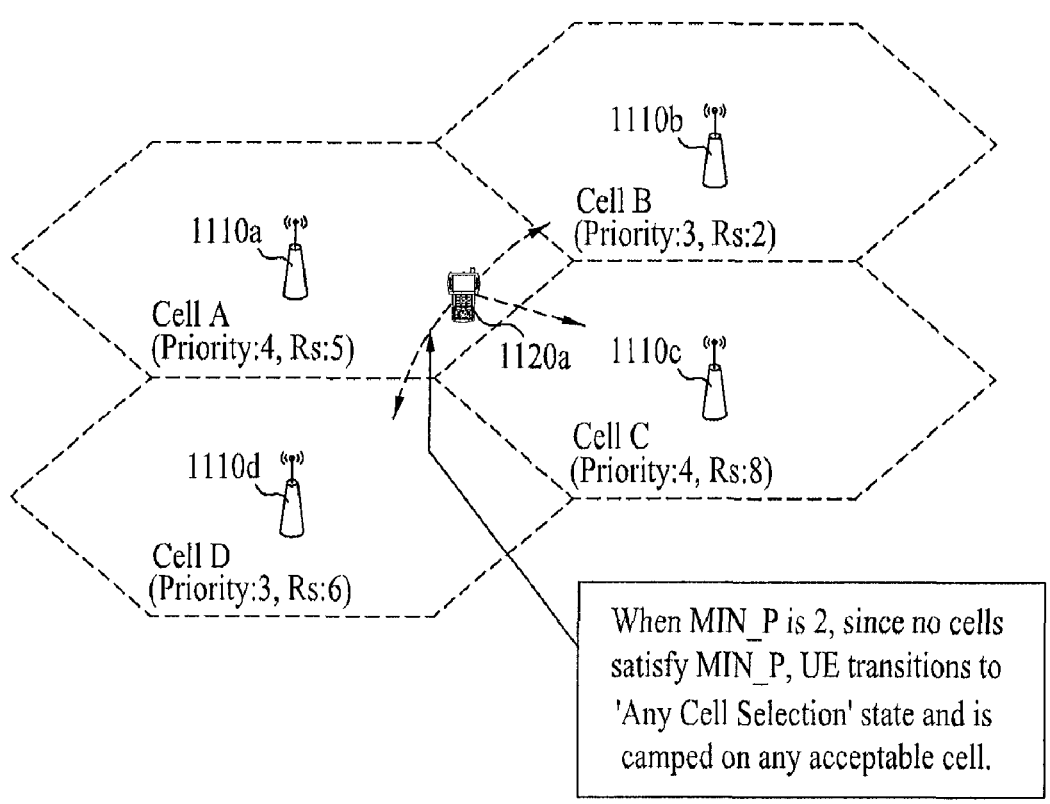

FIG. 11B is another conceptual view when the first criterion is used for 'restriction purpose'.

Referring to FIG. 11B, there are cells A to D and the respective cells A to D provide a service in corresponding Node Bs 1110*a* to 1110*d*. The respective Node Bs may use different frequencies and/or RATS. The cells A to D have priorities of 4, 3, 4, and 3, respectively. The priorities may be frequency priorities, RAT priorities, cell priorities, or a combination thereof. The cells A to D have signal characteristic values of 5, 2, 8, and 6, respectively. A UE 1120*a* receives a service from the cell A in a cell boundary. It is assumed in FIG. 11B that a minimum priority, MIN_P, is 2 and the MIN_P is used as a criterion for distinguishing between a suitable cell and an acceptable cell.

Under such a circumstance, since a signal characteristic value of the UE 1120*a* in the boundary of the cell A is less than a specific value (e.g., $S_{intersearch}$), a cell reselection process is triggered. Since a cell satisfying the MIN_P (namely, a suitable cell) does not exist, the UE transitions to the 'Any Cell Selection' state. Next, the UE is camped on one of the cells A to D to transition to the 'Camped on Any Cell' state and performs operation (e.g., periodic search of a suitable cell) performed in the 'Camped on Any Cell' state.

In FIG. 11A and FIG. 11B, a UE receiving a service in a cell having a priority equal to or higher than (or higher than) the MIN_P can omit measurement for a cell having a priority less than (or equal to or less than) the MIN_P. Especially, when the MIN_P is used as a criterion for discriminating between a suitable cell and an acceptable cell, the cell receiving a service in the suitable cell may omit measurement for the cell having a priority less than (or equal to or less than) the MIN_P. Further, if a suitable cell having a priority equal to or higher than (or higher than) the MIN_P is not found, a UE transitions to the 'Any Cell Selection' state to additionally measure a cell having a priority less than (or equal to or less than) the MIN_P.

Figure 12:
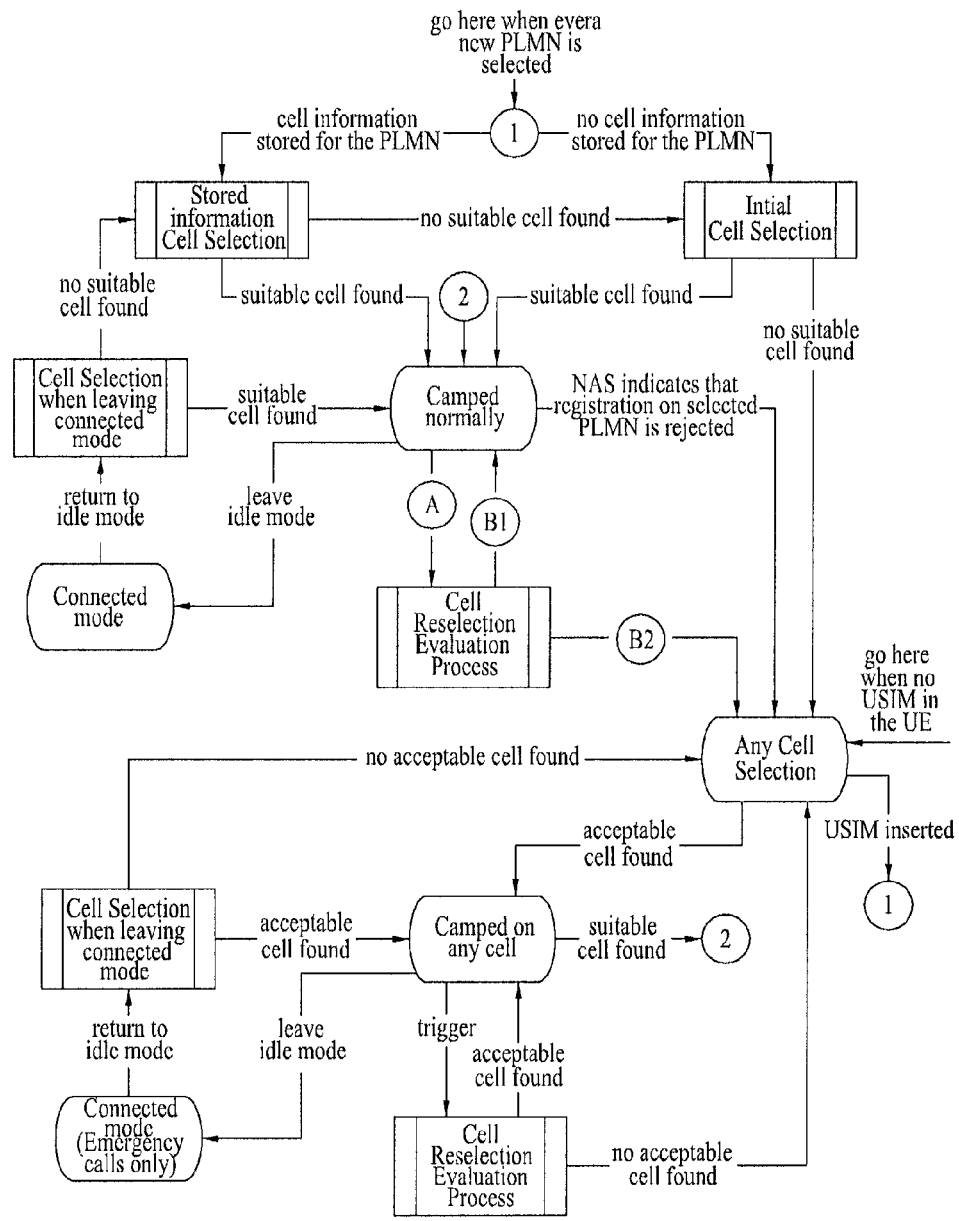
FIG. 12 illustrates an example of state and state transition of a UE related to cell (re)selection according to an exemplary embodiment of the present invention.

FIG. 12 illustrates an example state and state transition of an UE in idle-mode related to cell (re)selection according to an exemplary embodiment of the present invention.

The idle-mode UE performs 'Stored information Cell Selection' or 'Initial Cell Selection' according to whether information about a PLMN is stored, after a power is on. If a suitable cell is found, the UE transitions 'Camped normally' state. If no suitable cells are found, the UE transitions to 'Any cell Selection' state. The UE transitioned to the 'Camped normally' state can trigger a cell reselection process when a serving cell does not satisfy the MIN_P or when a signal characteristic value of the serving cell is less than a specific value even though the serving cell satisfies the MIN_P. If a suitable cell satisfying the MIN_P is present in the cell reselection process, the UE maintains the 'Camped normally' state. If a RRC connection is needed in the 'Camped normally' state, the UE transitions to 'Connected mode'. If the connection is ended, the UE reselects a cell. Meanwhile, if no suitable cells satisfy the MIN_P, the UE transitions to the 'Any Cell Selection' state. If an acceptable cell is found in the 'Any Cell Selection' state, the UE is camped on the acceptable cell to transition to 'Camped on any cell' state and periodically searches a suitable cell. Although the UE can transition to the 'Connected mode' even in the 'Camped on any cell' state, only a limited service such as an urgent call can be received. Although, in the drawings and a description thereof, the first criterion used as 'trigger purpose' and 'restriction purpose' is illustrated as the MIN_P, the first criterion may have different values according to usage. Furthermore, as illustrated in FIG. 12, the first criterion of the trigger purpose and the first criterion of the restriction purpose may be separately used or may be used by a combination thereof. In addition, although the MIN_P is illustrated only in the cell reselection process, the exemplary embodiment of the present invention is applicable to any step of reselecting a cell according to a suitable cell and an acceptable cell.

Figure 13:
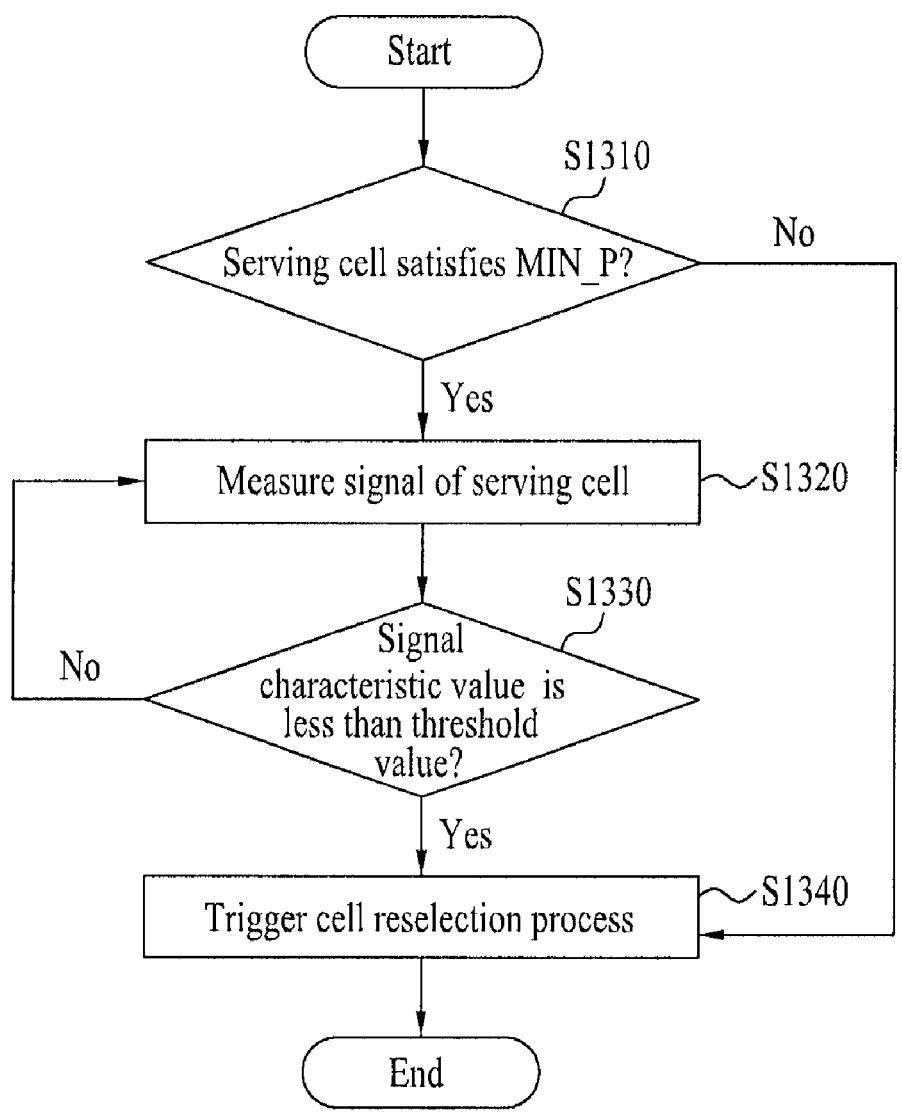
FIG. 13 is a flow chart illustrating a cell reselection process according to an exemplary embodiment of the present invention.

FIG. 13 is a flow chart illustrating a cell reselection process according to an exemplary embodiment of the present invention.

A UE in a cell boundary determines whether a serving cell satisfies a MIN_P, that is, a priority of the serving cell is higher than (or equal to or higher than) the MIN_P (step S1310). The priority and the MIN_P may be frequency priorities, RAT priorities, cell priorities, or a combination thereof. If the serving cell does not satisfy the MIN_P, the UE triggers a cell reselection process (step S1340). If the serving cell satisfies the MIN_P, the UE measures a signal of the serving cell (step S1320). The UE determines whether a signal characteristic value of the serving cell is less than (or equal to or less than) a threshold value (step S1330). If the signal characteristic value is less than (or equal to or less than) the threshold value, the UE triggers the cell reselection process (S1340). If the signal characteristic value is greater than (or equal to or greater than) the threshold value, the UE measures a signal of the serving cell (step S1320).

Figure 14A:
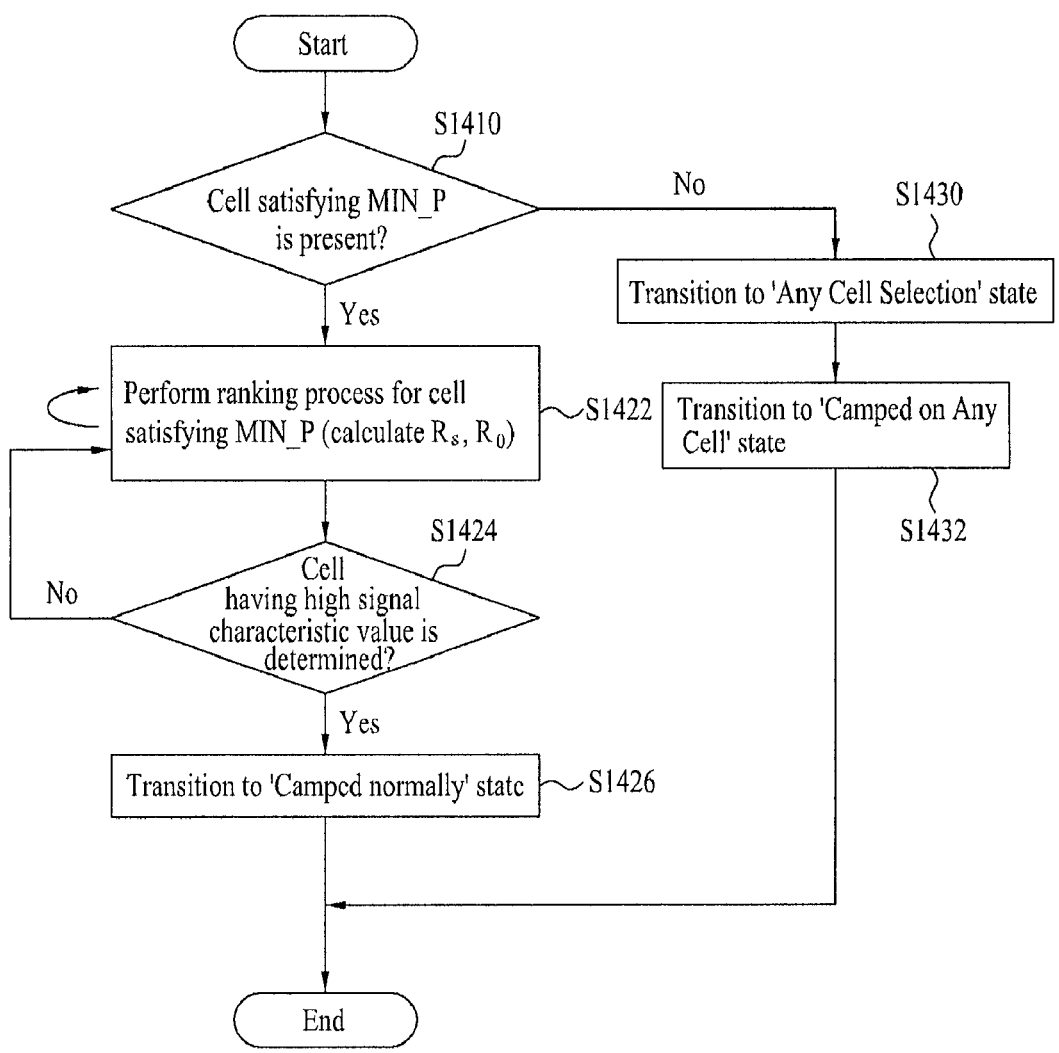
FIGS. 14A and 14B are flow charts illustrating a cell reselection process according to another exemplary embodiment of the present invention.
Figure 14B:
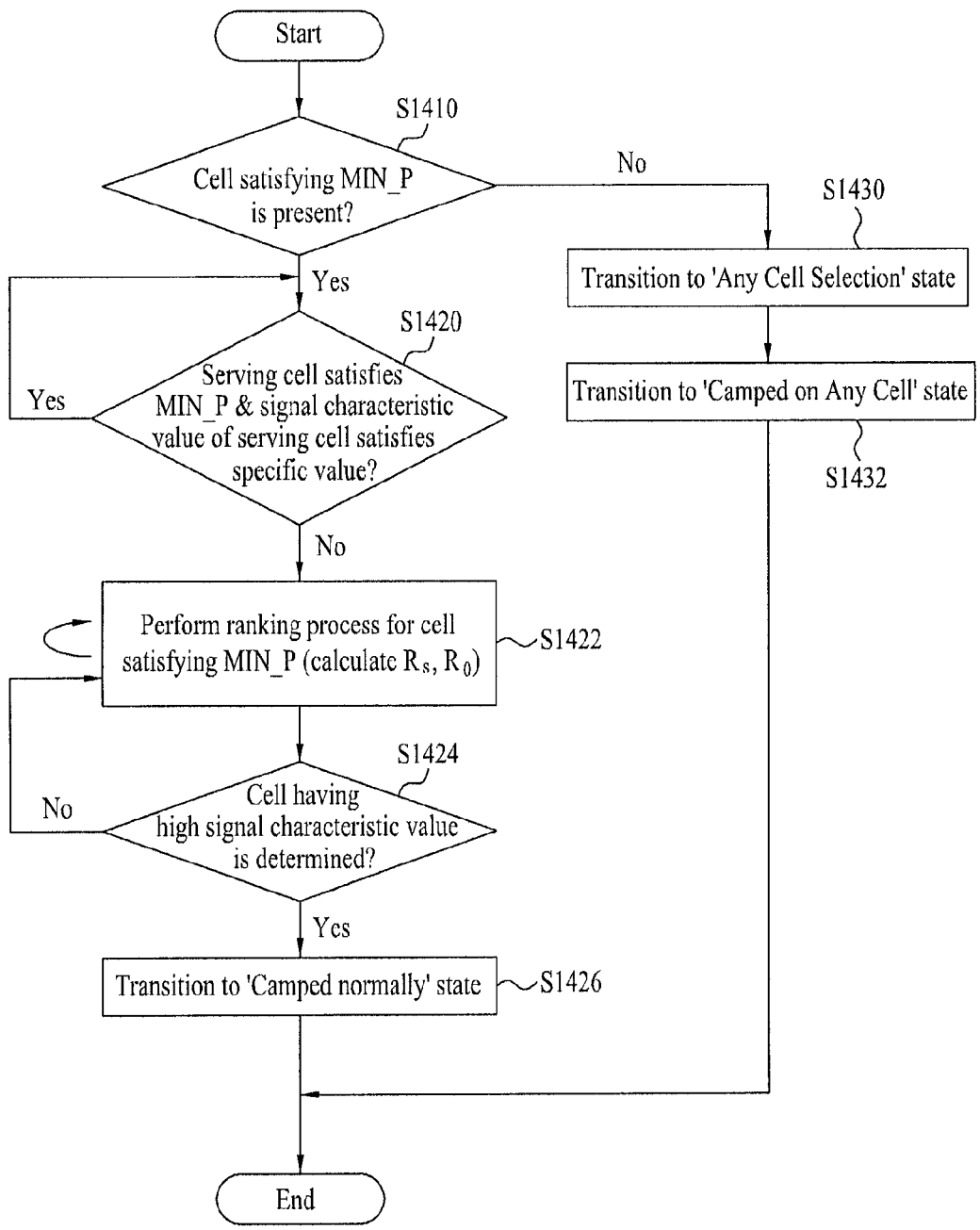

FIGS. 14A and 14B are flow charts illustrating a cell reselection process according to another exemplary embodiment of the present invention. In FIGS. 14A and 14A, the first criterion is used for 'restriction purpose' and may be also used as a criterion for selecting a suitable cell and an acceptable cell.

Referring to FIG. 14A, if a cell reselection process is triggered, a UE determines whether a cell (namely, a candidate cell) satisfying a MIN_P is present among a serving cell and neighbor cells (step S1410). If no cells satisfy the MIN_P, the UE transitions to 'Any Cell Selection' state (S1430). Next, if an acceptable cell is found, the UE is camped on the acceptable cell to transition to 'Camped on Any Cell' state (step S1432).

If a cell satisfying the MIN_P is present, the UE performs a process for selecting a cell having good signal characteristics. A ranking procedure is illustrated in FIG. 14A. That is, the UE may perform the ranking procedure according to the following equation with respect to a candidate cell satisfying the MIN_P (step S1422).

$R_s = Q_{meas,s} + Qhyst_s$ $R_n = Q_{meas,n} - Q\text{offset}$

Here, $Q_{meas,s}$ denotes an RSRP value measured for the serving cell by the UE, $Q_{meas,n}$ denotes an RSRP value measured for neighbor cells by the UE, $Qhyst_s$ denotes a hysteresis value for weighting the serving cell, and Qoffset denotes at least one of a bias value between cells and a bias value between different frequencies.

In the ranking procedure, if a cell having the highest signal characteristic value satisfies $R_n > R_s$ for a specific time $Treselection_{EUTRAN}$, the UE selects a cell corresponding to $R_n$. Namely, the UE selects a cell having the best signal characteristic among cells having better signal characteristics than the serving cell (step S1424). If the UE is camped on a cell having good signal characteristics, the UE transitions to 'Camped normally' state (step S1426).

As an example for applying the above process, priority information received through a neighbor cell list is shown in Table 1.

TABLE 1

| Neighbor cell | Priority | Signal strength (RSRP, dBm) |
|---|---|---|
| A (Serving cell) | 1 | −200 |
| B | 3 | −120 |
| C | 2 | −150 |
| D | 2 | −60 |
| E | 1 | −90 |

If the MIN_P is set to 2, the UE selects four cells A, C, D, and E except for a cell B (step S1410). Next, the UE selects the cell E having the highest signal strength according to the ranking procedure (step S1422 to S1426). In this embodiment, the UE regards the cell B as an acceptable cell and regards the other four cells as suitable cells.

Referring to FIG. 14B, one step is inserted between step S1410 and step S1422 of FIG. 14A. Since basic procedures of FIG. 14A and FIG. 14B are the same, only different parts thereof will now be described in brief. Similarly to FIG. 14A, a UE confirms whether a cell satisfying a MIN_P is present if a cell reselection process is triggered (step S1410). If a candidate cell satisfying the MIN_P is present, the UE performs a ranking procedure only when a prescribed condition is satisfied, unlike FIG. 14A. Namely, if a serving cell satisfies the MIN_P and a signal characteristic value of the serving cell satisfies a specific value (that is, if the signal characteristic value is equal to or greater than (or greater than) a specific value), the UE may not measure a signal of other cells (step S1420). However, if the serving cell does not satisfy the MIN_P or a signal characteristic value of the serving cell does not satisfy a specific value (that is, if the signal characteristic value is less than (or equal to or less than) a specific value in step S1420, the UE performs the ranking procedure in order to select a cell having good signal characteristics.

Figure 15:
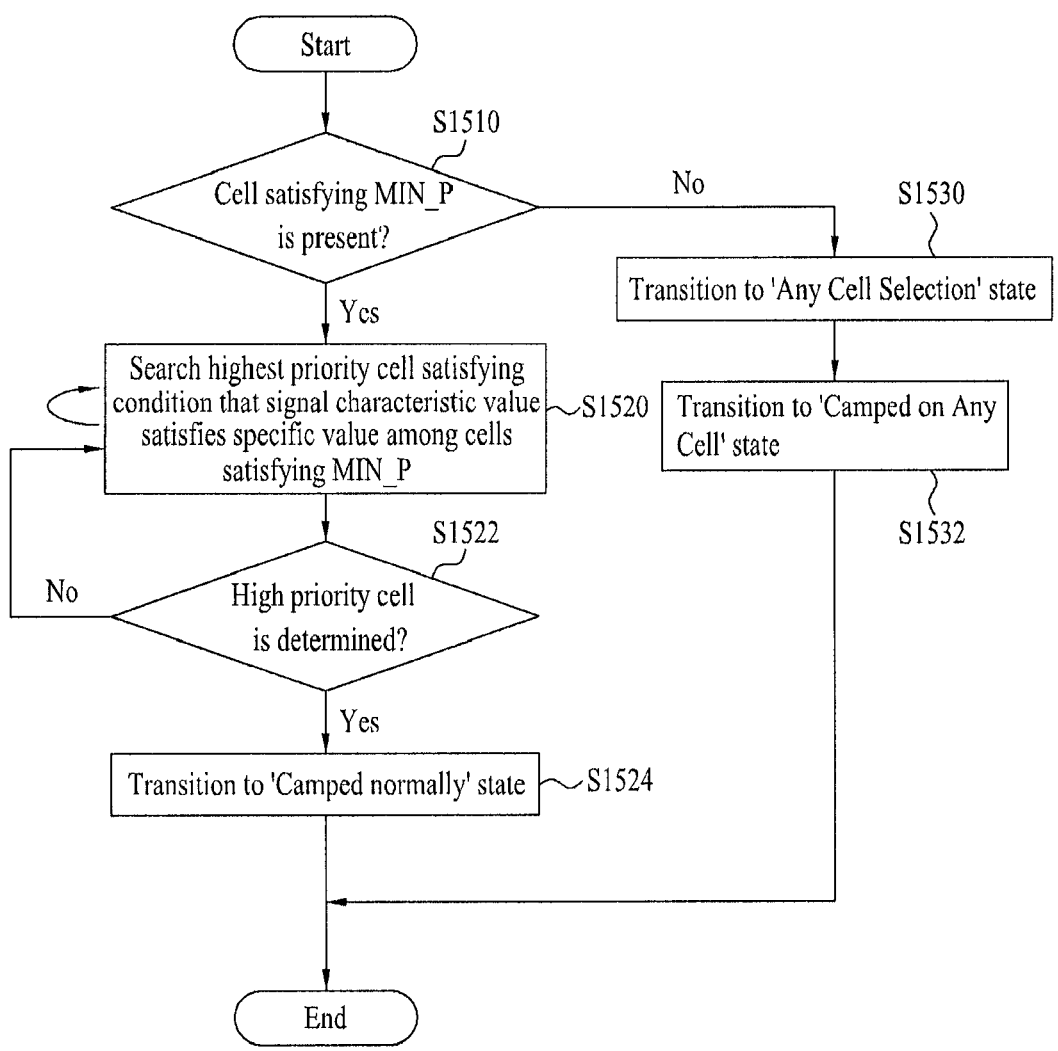
FIG. 15 is a flow chart illustrating a cell reselection process according to a further exemplary embodiment of the present invention.

FIG. 15 is flow chart illustrating a cell reselection process according to a further exemplary embodiment of the present invention. FIG. 15 shows another example using the first criterion for 'restriction purpose'. The first criterion may be also used as a criterion for selecting a suitable cell and an acceptable cell.

Referring to FIG. 15, if a cell reselection process is triggered, a UE determines whether a cell (namely, a candidate cell) satisfying a MIN_P is present among a serving cell and neighbor cells (step S1510). If no cells satisfy the MIN_P, the UE transitions to 'Any Cell Selection' state (S1530). Next, if an acceptable cell is found, the UE is camped on the acceptable cell to transition to 'Camped on Any Cell' state (step S1532).

Meanwhile, if cells satisfying the MIN_P are present, the UE performs a process for selecting a high priority cell is performed. That is, the UE searches the highest priority cell satisfying a condition that a signal characteristic value satisfies a specific value among the candidate cells satisfying the MIN_P (S1520). Next, if the UE determines the highest priority cell satisfying the above condition (step S1522), the UE is camped on the highest priority cell to transition to 'Camped normally' state (S1524).

Figure 16A:
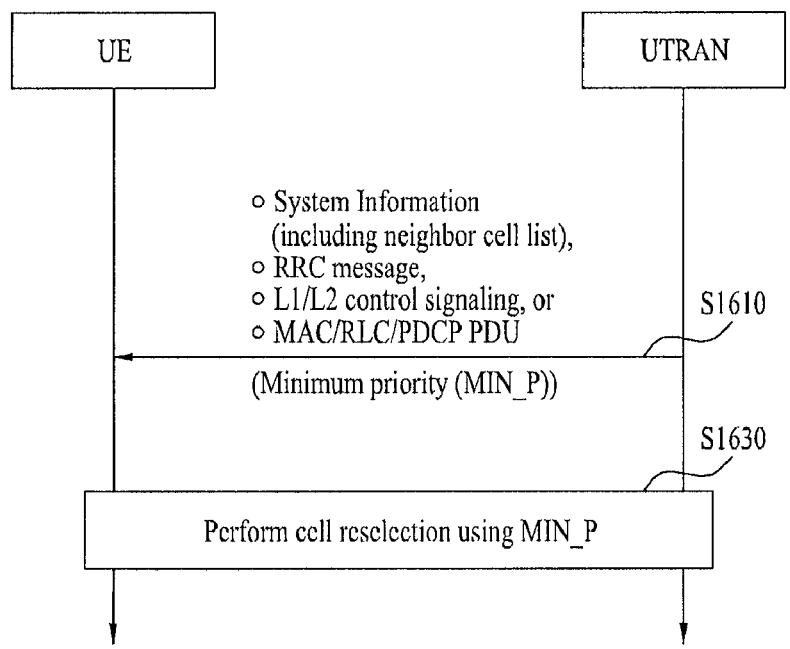
FIG. 16A illustrates an example of a method of receiving a first criterion for priorities according to an exemplary embodiment of the present invention.
Figure 16B:
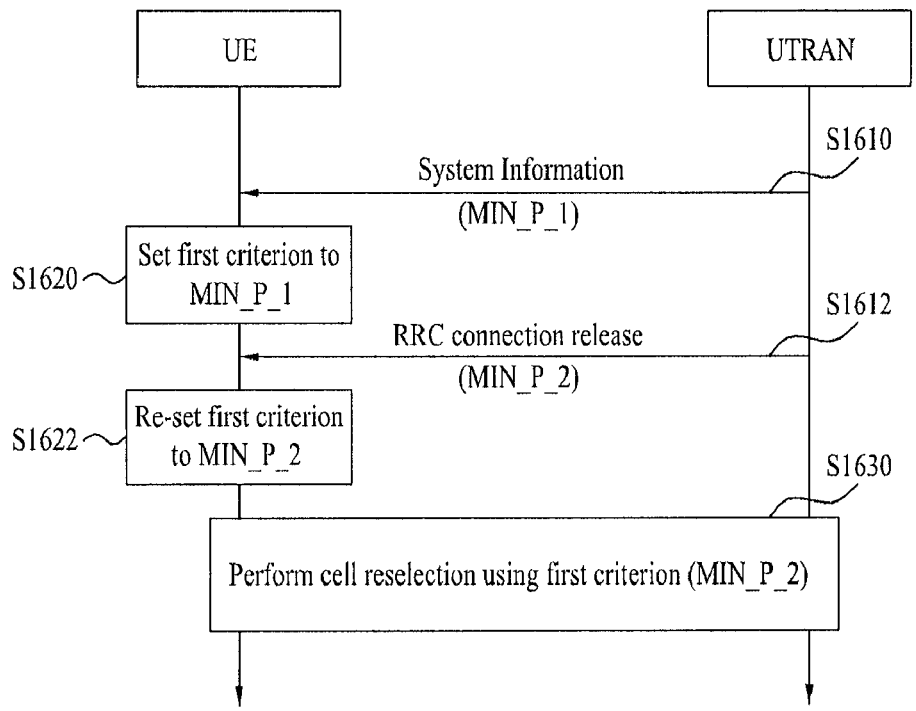
FIG. 16B illustrates an example of a method of performing cell reselection when a first criterion is repeatedly received according to an exemplary embodiment of the present invention.

FIG. 16B illustrates an example of a method of receiving a first criterion for priorities according to an exemplary embodiment of the present invention.

The first criterion may be provided from a network. The network may determine the first criterion to satisfy the following various purposes:
  QoS to be provided to a UE;
  network sharing;
  subscriber type;
  closed subscriber group (CSG) or home Node B;
  load balancing; and
  operator policy
The above purposes have been previously described.

The first criterion may be transmitted to a UE through system information, a RRC message, L1/L2 control signaling (for example, a PDCCH), or MAC/RLC/PDCP PDUs. The RRC signal may be a signal related to RRC connection release, RRC connection request, RRC connection setup, radio bearer setup, radio bearer reconfiguration, RRC connection reconfiguration, RRC connection re-establishment.

In FIG. 16A, a UE receives a MIN_P by the above-described method (step S1610) and performs cell reselection using the MIN_P (step S1630).

The first criterion may be UE-common or UE-specific. If the first criterion is UE-common, the first criterion may be common in units of a PLMN, a registered area, a tracking area, a cell, a group, or a RAT. For example, the first criterion may be transmitted to all UEs within a cell through the system information. Alternatively, the first criterion may be transmitted through the RRC connection release so that only a specific UE can perform operation according to the exemplary embodiment of the present invention. That is, a method of transmitting the first criterion to the UE and a range of an applicable UE become different according to whether the first criterion is UE-common or UE-specific.

The first criterion may be periodically or aperiodically indicated by a network. The first criterion may be invalidated in some cases. For example, when the first criterion is UE-common, the first criterion may be invalidated if the PLMN, registered area, cell, group, or RAT is changed. As another example, when the first criterion is UE-specific, the first criterion may be invalidated while state of the UE transitions to a connected mode from an idle mode. Namely, the first criterion may be invalidated by a specific RRC signal for causing the UE to transition to the connected mode from the idle mode. For instance, the first criterion may be invalidated when the UE transmits a RRC connection request, when the UE receives a RRC connection setup from a Node B, or when the UE transmits a RRC connection complete to the Node B. Alternatively, the first criterion may be invalidated while state of the UE transitions to the idle mode from the connected mode. Namely, the first criterion may be invalidated by a specific RRC signal for causing the UE to transition to the idle mode from the connected mode. For instance, the first criterion may be invalidated by a RRC connection release.

Further, the first criterion may be invalidated when a prescribed time elapses after the UE receives the first criterion.

FIG. 16B illustrates an example of a method of performing cell reselection when a first criterion is repeatedly received according to an exemplary embodiment of the present invention.

A UE may repeatedly receive a first criterion from a network. The repeatedly received first criterion may be the same or may be different. If the UE repeatedly receives the first criterion, a UE-specific first criterion may have priority over a UE-common first criterion. Moreover, the first criterion received by a specific method may have priority over the first criterion received by other methods. For example, the UE receives the first criterion through system information (step S1610). The UE may further receive the first criterion through a RRC connection release (step S1612). In this case, the UE may disregard the first criterion received through the system information and may perform cell reselection according to the first criterion received through the RRC connection release (steps S1620, S1622, and S1630). Next, the UE in idle mode may be RRC-connected to a Node B to receive a service from the Node B, and in this process, the first criterion received by the previous RRC connection release may be invalidated. If the UE has not received the first criterion from the network during the RRC connection release after receiving a service from the Node B, the UE returning to an idle mode performs cell reselection using the first criterion before RRC connection or performs cell reselection using the first criterion newly received from the system information.

In the exemplary embodiment of the present invention, the Node B may restrict a specific cell (e.g., a cell of a specific frequency/RAT) so that the UE may not select the cell. Since the UE can receive a service in a cell permitted by the Node B, a RRC connection delay which is generated during a RRC request can be prevented by camping on a cell in which it is difficult to receive a service. If a signal characteristic value of a serving cell is greater than a specific threshold value when the UE receives a service from a permitted cell (namely, when the UE is camped on a cell higher than a MIN_P), overhead for additional measurement for a higher priority cell than the serving cell can be reduced. Accordingly, power consumption which is generated in a measurement process for cell reselection can be effectively reduced. Further, for cells higher than the MIN_P, a cell can be selected based on a ranking procedure by disregarding priorities. Therefore, since the UE receives a service in a cell having a relatively higher signal characteristic value than in a cell reselection method using priorities, an error rate which is generated during data transmission and reception can be effectively reduced. Moreover, since a specific cell is excluded from reselection, traffic of the UE using a radio network can be equally allocated. Therefore, use of the radio network is improved and satisfaction of service use of a user can be increased.

The exemplary embodiments described hereinabove are combinations of elements and features of the present invention. The elements or features may be considered selective unless otherwise mentioned. Each element or feature may be practiced without being combined with other elements or features. Further, the embodiment of the present invention may be constructed by combining parts of the elements and/or features. Operation orders described in the embodiments of the present invention may be rearranged. Some constructions of any one embodiment may be included in another embodiment and may be replaced with corresponding constructions of another embodiment. It is apparent that the present invention may be embodied by a combination of claims which do not have an explicit cited relation in the appended claims or may include new claims by amendment after application.

In exemplary embodiments of the present invention, a description is mainly made of a data transmission and reception relationship between a Node B and a user equipment. Here, a specific operation described as being performed by the Node B may be performed by an upper node of the Node B. Namely, it is apparent that, in a network comprised of a plurality of network nodes including a Node B, various operations performed for communication with the user equipment may be performed by the Node B, or network nodes other than the Node B. The term 'Node B' may be replaced with a fixed station, a base station, an eNode B (eNB), an access point, etc. The term 'user equipment' may be replaced with a mobile terminal, a mobile station (MS), a mobile subscriber station (MSS), etc.

The embodiments of the present invention may be achieved by various means, for example, hardware, firmware, software, or a combination thereof. In a hardware configuration, the embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. A software code may be stored in a memory unit and driven by a processor. The memory unit is located at the interior or exterior of the processor and may transmit data to and receive data from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to a wireless communication system, especially to a method of reselecting a cell in the wireless communication system.

What is claimed is:

1. A method of performing cell reselection based on priorities by a user equipment (UE) in a wireless communication system, the method comprising the steps of:
   selecting one or more candidate cells satisfying a first criterion associated with priorities among a serving cell and neighbor cells; and
   camping on a cell satisfying a second criterion for cell reselection among the one or more candidate cells,
   wherein the first criterion is UE-common or UE-specific, and
   if there are two or more first criterions, a UE-specific first criterion has a priority over a UE-common first criterion.

2. The method of claim 1, wherein the priorities are related to frequencies, radio access technologies (RATs), cells, or any combination thereof.

3. The method of claim 1, wherein the priorities are UE-common or UE-specific.

4. The method of claim 1, wherein the first criterion is a minimum priority which should be satisfied by the candidate cells.

5. The method of claim 1, further comprising receiving the first criterion from a network.

6. The method of claim 5, wherein the first criterion is invalidated when a certain period of time has elapsed after the reception of the first criterion, or when a region, a cell or a group to which the UE belongs has been changed.

7. The method of claim 1, wherein the first criterion is used to distinguish between a suitable cell and an acceptable cell.

8. The method of claim 7, wherein if no cells satisfy the first criterion, the UE transitions to 'Any Cell Selection' state.

9. The method of claim 7, wherein if any cell satisfies the first criterion, the UE transitions to 'Camped normally' state.

10. The method of claim 1, wherein the second criterion comprises selecting the highest priority cell among one or more cells satisfying a specific signal characteristic value.

11. The method of claim 1, wherein the second criterion comprises selecting a cell having good signal characteristics.

12. The method of claim 11, wherein the second criterion comprises selecting a cell having good signal characteristics using a ranking procedure.

13. The method of claim 11, wherein if a signal characteristic value of the serving cell is equal to or more than a specific value, the selecting a cell having good signal characteristics is not performed.

14. The method of claim 1, wherein the cell reselection comprises at least one of intra-frequency cell reselection, inter-frequency cell reselection, and inter- radio access technology (RAT) cell reselection.

15. A method of performing cell reselection based on priorities in a wireless communication system, the method comprising the steps of:
   determining whether or not a serving cell satisfies a first criterion associated with priorities; and
   if the serving cell satisfies the first criterion, triggering a cell reselection procedure only when a signal characteristic value of the serving cell is equal to or less than a specific value,
   wherein the first criterion is UE-common or UE-specific, and
   if there are two or more first criterions, a UE-specific first criterion has a priority over a UE-common first criterion.

16. The method of claim 15, wherein the priorities are related to frequencies, radio access technologies (RATs), cells, or any combination thereof.

17. The method of claim 15, wherein the priorities are UE-common or UE-specific.

18. The method of claim 15, wherein the first criterion is a minimum priority which should be satisfied by the serving cell.

19. The method of claim 15, further comprising receiving the first criterion from a network.

20. The method of claim 15, wherein the first criterion is invalidated when a certain period of time has elapsed after the reception of the first criterion, or when a region, a cell or a group to which the UE belongs has been changed.

21. A method of transmitting control information associated with cell reselection in a wireless communication system, the method comprising the steps of:
   transmitting a first message indicating information associated with priorities used during the cell reselection; and
   transmitting a second message indicating a first criterion associated with priorities which should be satisfied by a serving cell and neighbor cells to be selected as a candidate cell, wherein the first criterion is UE-common or UE-specific, and if there are two or more first criterions, a UE-specific first criterion has a priority over a UE-common first criterion.

22. The method of claim 21, wherein the priorities are related to frequencies, radio access technologies (RATs), cells, or any combination thereof.

23. The method of claim 21, wherein the priorities are UE-common or UE-specific.

24. The method of claim 21, wherein the information associated with priorities is a neighbor cell list (NCL).

25. The method of claim 21, wherein the first criterion is a minimum priority which should be satisfied by the serving cell and the neighbor cells to be selected as the candidate cell.

26. The method of claim 21, wherein the first criterion is UE-common or UE-specific.

* * * * *